United States Patent
Baldemair et al.

(10) Patent No.: US 8,761,281 B2
(45) Date of Patent: Jun. 24, 2014

(54) METHOD AND ARRANGEMENT FOR ADAPTING A SIGNAL IN A WIRELESS COMMUNICATIONS NETWORK

(75) Inventors: Robert Baldemair, Solna (SE); Stefano Sorrentino, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 157 days.

(21) Appl. No.: 13/379,148

(22) PCT Filed: Jun. 29, 2009

(86) PCT No.: PCT/SE2009/050826
§ 371 (c)(1),
(2), (4) Date: Dec. 19, 2011

(87) PCT Pub. No.: WO2011/002355
PCT Pub. Date: Jan. 6, 2011

(65) Prior Publication Data
US 2012/0099666 A1 Apr. 26, 2012

(51) Int. Cl.
*H04K 1/10* (2006.01)
*H04L 27/28* (2006.01)

(52) U.S. Cl.
USPC .......................................... 375/260; 375/259

(58) Field of Classification Search
USPC .................................................. 375/260, 259
See application file for complete search history.

(56) References Cited

U.S. PATENT DOCUMENTS

2004/0233981 A1* 11/2004 Porter et al. .................. 375/229

FOREIGN PATENT DOCUMENTS

WO    2008021392 A2    2/2008
WO    WO 2008/133582    * 11/2008

OTHER PUBLICATIONS

International Search Report for PCT/SE2009/050826 mailed Aug. 13, 2010.
Written Opinion for PCT/SE2009/050826 mailed Aug. 13, 2010.
International Preliminary Report on Patentability for PCT/SE2009/050826 mailed Aug. 31, 2011.
Ericsson, "Uplink SU-MIMO in LTE-Advanced," 3GPP TSG-RAN WG1 #57bis, R1-092027, San Francisco, CA, USA, May 4-8, 2009, pp. 1-14, XP050339495.
Suyama, S., et al., "PAPR Reduction Methods for Eigenmode MIMO-OFDM Transmission," 2009 IEEE 69th Vehicular Technology Conference, Apr. 26-29, 2009, Barcelona, Spain, pp. 1-5, XP031474714.

* cited by examiner

*Primary Examiner* — Chieh M Fan
*Assistant Examiner* — Brian J Stevens
(74) *Attorney, Agent, or Firm* — Patent Portfolio Builders PLLC

(57) ABSTRACT

According to an aspect of the present invention, the power efficiency of a precoded OFDM signal is improved by a method in a network node, e.g. a mobile terminal, for adapting a signal for multi-antenna transmission. In a first step, the network node receives at least a first parameter being related to the transmit power requirements of the network node. The network node then receives, a second parameter indicating a precoder W. In a further step, the network node determines a modified precoder $\tilde{W}$, having the same dimensions as W, using the precoder W and the at least first parameter; then, the network node adapts, the signal for multi-antenna transmission using the modified precoder $\tilde{W}$.

26 Claims, 14 Drawing Sheets

METHOD AND ARRANGEMENT FOR ADAPTING A SIGNAL IN A WIRELESS COMMUNICATIONS NETWORK

TECHNICAL FIELD

The present invention relates to methods and arrangements for adapting a signal for multi-antenna transmission in a wireless communications system.

BACKGROUND

Orthogonal Frequency Division Multiplexing, OFDM, is a modulation concept for use in wireless systems, e.g. 3GPP Long Term Evolution, LTE, IEEE WiMAX 802.16x, IEEE WiFi 802.11x, etc., which uses a large number of closely spaced orthogonal sub-carriers to carry data. OFDM allows flexible resource allocation over a wide bandwidth and more practical channel equalization algorithms as compared to more traditional single carrier systems. However, the OFDM signal is characterized by large fluctuations of its power envelope that result in occasional spikes in the power of the signal. Therefore, OFDM systems should be designed allowing large power margins, also known as power back-off, because the RF PA (Radio Frequency Power Amplifier), as well as other digital and analog components need to be dimensioned in order to handle the occasional power peaks of the OFDM signal.

Various metrics have been introduced for the quantification of the dispersion of the histogram of the power envelope of OFDM signals. The most common ones are the Peak to Average Power Ratio (PAPR) and the Cubic Metric (CM), as defined by Eq. 1 below. The Cubic Metric is currently employed as a reference measure in 3GPP. These metrics capture statistical properties of the signal and provide a preliminary indication of power derating, i.e., the power safety margin, i.e. back-off, that has to be kept in the power amplifier in order to reasonably limit the amount of distortion and out-of-band emission.

$$CM = 20\log_{10}\left[\text{rms}\left[\left(\frac{|y(t)|}{\text{rms}(y(t))}\right)^3\right]\right] \quad \text{Eq 1}$$

For energy, cost, or space critical designs, e.g. in mobile devices, the power back-off margins required by OFDM may lead to an inefficient solution. Therefore, a modified OFDM modulation scheme, namely DFTS-OFDM (Discrete Fourier Transform Spread OFDM, also known as Single Carrier-OFDM or SC-OFDM), has been introduced and adopted by 3GPP LTE in order to improve the efficiency of uplink transmissions, i.e., reduce the PAPR and CM. In DFTS-OFDM a DFT (Discrete Fourier Transform) precoder is placed before the IDFT (Inverse Discrete Fourier Transform) modulator that is conventionally used for OFDM. Even though subcarrier mapping and equalization are still possible with roughly the same properties of conventional OFDM systems, DFTS-OFDM leverages a lower PAPR and CM than OFDM. This leads to lower power back-off margins in the PA and other components of the transmitter.

Another means to achieve better power efficiency in a mobile device is power control: the average power transmitted by a device is optionally reduced in order, e.g., to extend battery life or reduce interference. Power control also improves performance on a global network level, since a mobile device which does not use more power than necessary will cause less interference to the rest of the network.

The evolution of wireless communication systems envisages also the adoption of adaptive solutions for the multi-antenna transmission in the uplink. Multi-antenna transmission and reception is sometimes referred to as MIMO, or Multiple Input Multiple Output. This may be achieved by linearly combining on each antenna the signals generated by multiple independent DFTS-OFDM precoders. The simultaneous transmission of multiple independent data streams on the same bandwidth by taking advantage of multiple antennas is usually termed as Spatial Multiplexing (SM), while the technique of delivering each data stream on multiple transmit antennas by use of specific linear weighting factors is usually termed as Beam-Forming (BF). The combination of BF and SM potentially provides increased throughput for MIMO enabled devices and is foreseen as one of the major technical innovations for the uplink of forthcoming wireless telecommunication systems. In the following, a DFTS-OFDM system comprising of SM and BF will be shortly termed as MIMO DFTS-OFDM.

A convenient way to implement MIMO DFTS-OFDM is to insert a linear combiner, i.e. a precoding matrix W, before the DFT precoder. If the matrix W is correctly chosen, the incoming data streams are combined on the transmit antennas in order to optimally exploit the propagation properties of the wireless channel. The desired combiner W is usually selected by the receiver from a predefined set of combiners and it is signalled to the transmitter through a feedback channel. Such a predefined set of combiners, or precoding matrices, is referred to as a codebook. 3GPP has specified a standardized codebook for use in LTE systems. This standardized codebook will hereinafter be referred to as the 3GPP codebook. The transmitter updates the spatial combiner to the value that has been fed back at the latest possibility. The receiver then assumes that the signalled value of W is being employed at the transmitter and combines it with an estimation of the channel H to allow correct reception. The estimation of H at the receiver is made possible because the transmitter periodically transmits a predefined set of demodulation pilot tones.

FIG. 1 shows an exemplary MIMO DFTS-OFDM system, as described above. The system in FIG. 1 comprises two antennas, denoted "Antenna 1" and "Antenna 2". Two data streams, denoted "data" are simultaneously transmitted on the same bandwidth. It should be noted that the use of two antennas and data streams is only exemplary. In general, the system may comprise any number Ntx of antennas, and any number Ns of data streams.

The system also includes a precoding unit 110, comprising coding and modulation units, a codeword to layer mapping unit, a spatial combiner W, and DFT precoders.

The two data streams are coded and modulated and fed to a spatial combining matrix W with dimensions 2×2 (spatial processing block). In the general case, the matrix W will have the dimensions Ntx×Ns, depending on the number of antennas and data streams, respectively. W distributes and weights the Ns incoming signals on the Ntx antennas. As mentioned above, the instantaneous value of W may be taken from a predefined codebook, and the specific codeword W to be used in the current transmission is based on a feedback previously received from the receiver.

The two streams that are produced by the spatial processing block are applied to corresponding two DFT precoders. Again, in the general case Ntx streams will be applied to Ntx DFT precoders. Each DFT precoder has size K and provides input to the corresponding IDFT modulator. Since the spatial processing and OFT are linear blocks, they might be equivalently swapped.

Each IDFT is followed by a power control block and a dedicated RF section, comprising also of a PA. The IDFT operates in a parallel way, i.e. on vectors. The P/S (parallel/serial) block serializes the output from the IDFT into a sequence for transmission. The CP (Cyclic Prefix) box is the cyclic prefix usually employed in OFDM systems. The cyclic prefix is a replica of part of the transmitted OFDM symbol. The CP box is useful for equalization at the receiver.

In an OFDM system using MIMO, the CM/PAPR may be too high even if DFTS-OFDM is used. This is particularly the case when the transmit antennas are strongly correlated, as will be further explained below. Transmit antennas are usually correlated when they are closely spaced compared to the wavelength of the transmitted signal, and when there are limited reflections in the environment surrounding the antennas. Transmit correlation is a common scenario in practice. Precoders that are suitable for correlated channels with strong correlation at the transmitter side often imply heavy mixing of the data streams on each antenna. Given a certain time and frequency resource, transmit correlation implies that the channels from different transmitting antennas to the same receiving antenna do not assume statistically independent values. The consequence is that the optimal spatial combiner W is usually a dense matrix, i.e. a matrix with no zero elements. This is reflected, e.g., in the combining matrices that have been standardized for the downlink of LTE, i.e. in the standardized 3GPP codebook.

However, the mixing of data streams implies a combination of independent signals. This has a negative effect on signal statistics, because according to the central limit theorem, the signal power of a large number of independent signals will approach a normal distribution. This is reflected by larger CM and PAPR. As has already been discussed, the consequence of high CM is a larger back-off in the Power Amplifier and consequently a less efficient design of the RF part.

A possible solution to reduce CM is to design a codebook of spatial combiners W such that the resulting CM is sufficiently moderate. This can be achieved, e.g., by nulling some elements in the combining matrix and avoid mixing of streams on the corresponding antennas. However, this usually comes at the price of reduced beamforming gain, especially for correlated channels, because the modified combining matrix diverges from the optimal dense matrix.

Another class of solutions that have been proposed in the literature is based on the processing of the signal to be modulated by, e.g., inserting suitable PAPR compensation tones or scrambling pattern. However, these techniques present several drawbacks: they are relatively complicated, they reduce spectral efficiency and they require dedicated signalling.

There is thus a need for a mechanism for improving power efficiency for precoded OFDM transmissions, which mitigates the drawbacks associated with the prior art.

SUMMARY

It is an object of at least some embodiments of the present invention to provide a mechanism for improving power efficiency for precoded transmissions in an OFDM-based wireless communications system.

According to an embodiment of the present invention, the object is achieved by a method in a network node, e.g. a mobile terminal, for adapting a signal for multi-antenna transmission. The network node is comprised in a wireless communications network, e.g. an OFDM-based network such as the E-UTRAN/LTE.

In a first step, the network node receives at least a first parameter being related to the transmit power requirements of the network node. In some embodiments, the at least first parameter is a power control command. In other embodiments, the at least first parameter is a modulation coding scheme (MCS).

The network node then receives a second parameter indicating a precoder W.

Based on the at least first parameter, the network node then determines whether to use a modified precoder.

In a further step, the network node determines a modified precoder $\tilde{W}$, having the same dimensions as W, using the precoder W and the at least first parameter, and the network node then adapts the signal for multi-antenna transmission using the modified precoder $\tilde{W}$.

According to one particular embodiment, the method further comprises modifying at least one pilot signal using the precoder W and the modified precoder $\tilde{W}$. The network node then transmits the at least one modified pilot signals.

Transmitting a modified pilot signal allows the receiver to estimate a distorted channel, and decode the signal correctly using the unmodified precoder W. Stated another way, the modified pilot signal will cause the receiver to estimate a channel which is different from the actual channel. However, the combination of this distorted channel and the unmodified precoder W will yield the correct result when decoding. Thus, in this embodiment no additional signalling is required.

According to a further aspect of the present invention, some of the objects are achieved by a method in a network node, e.g. a base station, for decoding a signal received from a transmitting node. The signal is adapted for multi-antenna transmission, and the network node and the transmitting node are both comprised in a wireless communications network.

According to the method, the network node determines at least a first parameter which is related to the transmit power requirements of the transmitting node. The network node then selects a precoder for decoding, based on the at least first parameter. In a further step, the network node receives a signal from the transmitting node. The network node then decodes the received signal using the selected precoder.

According to a further embodiment of the present invention, the object is achieved by a method of generating a modified codebook for use in adapting a signal for multi-antenna transmission. The modified codebook is generated based on an existing codebook comprising at least one precoder. For at least one precoder $W_n$ comprised in the existing codebook, the method comprises the following steps: First, at least one shaping matrix S is determined. The shaping matrix S has the same dimensions as the precoder $W_n$, and is determined such that each element $s_{i,j}$ of S has a value either equal to one, or equal to one multiplied by a factor $\alpha$, wherein the factor $\alpha$ depends on the value of the at least first parameter, and wherein the value of a is less than or equal to one, and greater than or equal to zero. Then, at least one modified precoder $\tilde{W}_n$ is determined as the element-wise product of the at least one shaping matrix S and $W_n$.

In one particular embodiment, the step of determining a modified precoder $\tilde{W}$ further comprises multiplying each element of $\tilde{W}$ with a scalar factor, in order to normalize the power to the desired level.

Finally, the at least one modified precoder $\tilde{W}_n$ is added to the codebook.

According to a further embodiment of the present invention, the object is achieved by a network node, e.g. a mobile terminal, for adapting a signal for multi-antenna transmission. The network node is comprised in a wireless communications network.

The network node comprises a receiving unit, which is configured to receive at least a first parameter being related to the transmit power requirements of the network node. The receiving unit is further configured to receive a second parameter indicating a precoder W.

The network node also comprises a codebook shaping unit, configured to determine a modified precoder $\tilde{W}$, having the same dimensions as W. The modified precoder $\tilde{W}$ is determined using the precoder W and the at least first parameter.

Furthermore, the network node comprises a precoding unit, configured to adapt the signal for multi-antenna transmission using the modified precoder $\tilde{W}$.

According to a further embodiment of the present invention, the object is achieved by a network node, e.g. a base station, for decoding a signal received from a transmitting node. The signal is adapted for multi-antenna transmission. The network node and the transmitting node are both comprised in a wireless communications network.

The network node comprises a transmit power requirements determining unit, configured to determine at least a first parameter, which is related to the transmit power requirements of the transmitting node.

The network node further comprises a precoder selection unit, which is configured to select a precoder for decoding, based on the at least first parameter.

Furthermore, the network node comprises a receiving unit, configured to receive a signal from the transmitting node.

The network node also comprises a decoding unit, which is configured to decode the received signal using the selected precoder.

According to at least some embodiments of the present invention, the spatial combiner or precoder W is adaptively modified depending on a parameter related to the transmit power requirements, i.e. the available power back-off, at the transmitter. By using this modified spatial combiner to precode the signal, the Cubic Metric (CM) is reduced. Thereby, the power efficiency of the precoded transmissions is improved. According to these embodiments, the precoder W is adapted such that the optimal beamforming gain of the 3GPP codebook is kept when the transmitted power is sufficiently low and power derating is not needed. However, when full power is required, and power derating becomes a critical parameter, the precoder W is modified such that the CM is reduced. Thus, according to these embodiments the trade-off between beamforming gain and CM may be adaptively tuned. This enables reduction of the PAPR/CM to be performed only when needed, at a low implementation cost.

A further advantage of some embodiments of the invention is that no dedicated signalling is required. Thus, the invention may be implemented in a standard transparent fashion, i.e. without changes to the current standard.

Yet another advantage of some embodiments of the invention is that it may be applied on top of a given codebook, i.e. it is not required to change the standardized codebook.

A further advantage is that the implementation cost is very low.

A further advantage of the invention is that it can be directly applied to MIMO DFTS-OFDM systems, which are foreseen to be a high potential architecture for forthcoming wireless systems.

DETAILED DESCRIPTION

According to an embodiment of the invention, the present solution adaptively modifies the spatial combiner, or precoder, W, depending on the transmit power requirements, i.e. the available power back-off, at the transmitter. By adaptively modifying the precoder W in this way, power efficiency is improved.

When power control is active and transmission power is sufficiently reduced from the maximum value, the power amplifiers operate in the linear region and there is no need to further control the cubic metric, CM. In this case, a codebook that maximizes beamforming gains, e.g., the standard-compliant 3GPP codebook, is employed.

On the other hand, CM becomes a critical issue when the transmitter is required to operate close to the maximum available power. In this case it may be beneficial to trade a reduced beamforming gain for a reduction of the CM, and corresponding reduction in power derating. This may be achieved by modifying one or more precoding matrices W from the 3GPP codebook, as will be described in more detail below.

According to an embodiment of the present invention, a mechanism is provided for reducing PAPR/CM in OFDM-based systems, e.g. MIMO DFTS-OFDM systems, with very limited implementation complexity. The disclosed mechanism is transparent to most of the blocks in a conventional DFTS-OFDM system. The invention may be implemented in two variations: an explicit version that requires dedicated signalling of control information and a transparent version that does not require specific control information.

Figure 1:
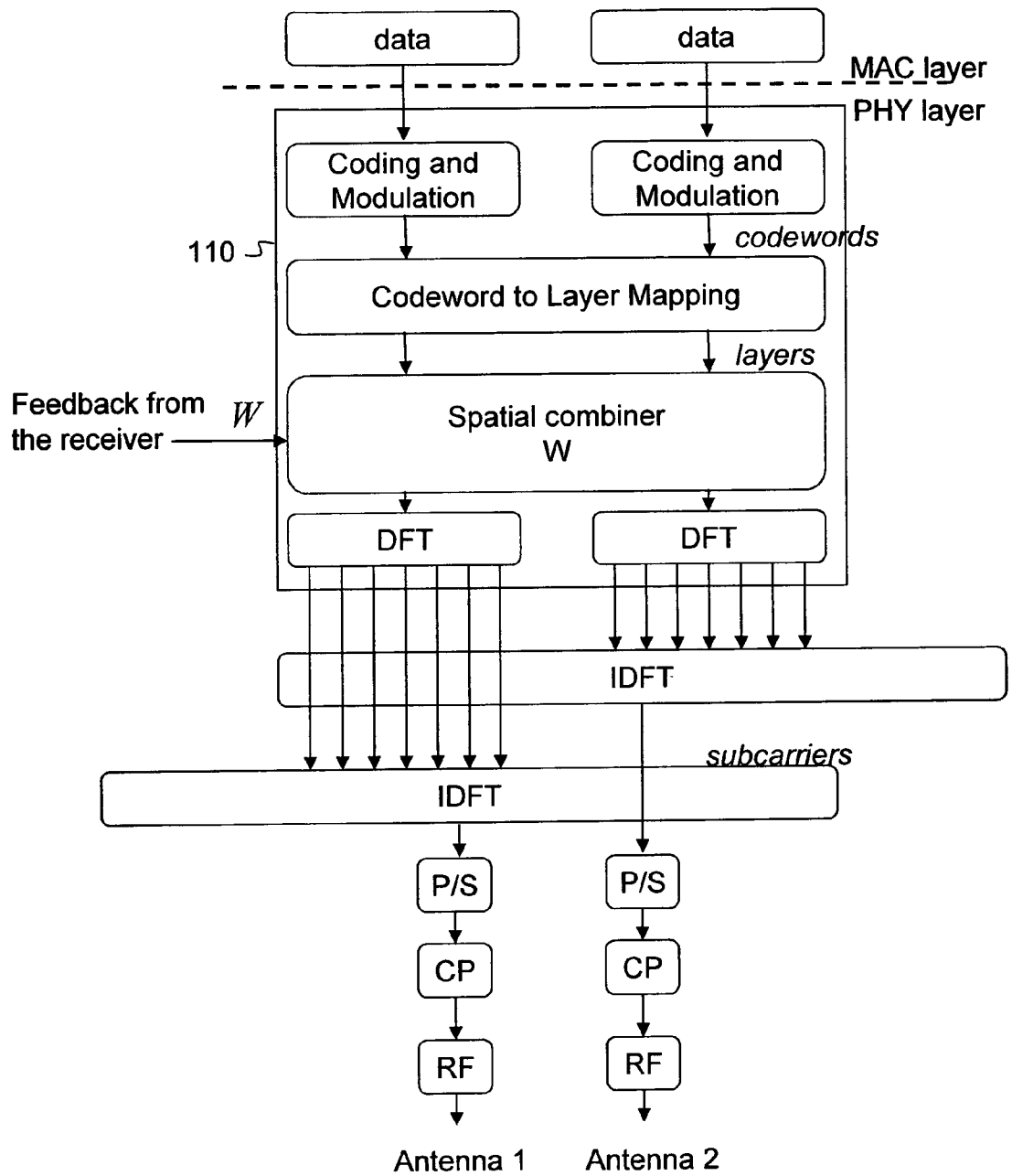
FIG. 1 is a schematic diagram illustrating a MIMO DFTS-OFDM system according to the prior art.
Figure 2:
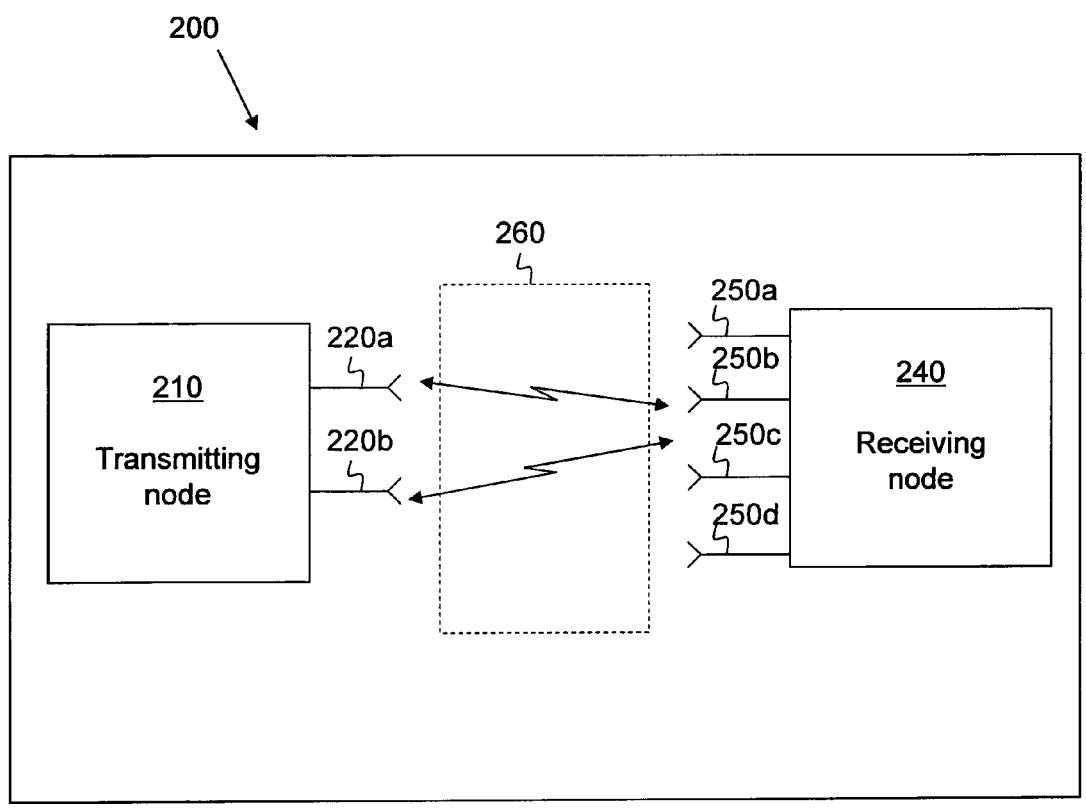
FIG. 2 is a schematic diagram illustrating a wireless communications system according to an embodiment of the present invention.

FIG. 2 shows a wireless communications system 200 comprising a transmitting network node 210 and a receiving network node 240. The network node 210 and the network node 240 are communicating across a wireless channel 260, i.e. a radio channel. In the following disclosure the wireless channel 260 will sometimes be denoted H.

The network node 210 comprises two antennas 220a, 220b, and the network node 240 comprises four antennas 250a, 250b, 250c, 250d. It should be noted that the number of antennas shown is for exemplary purposes only, and that the network nodes 210 and 240 may have any number of antennas. However, since precoding is performed at the transmitting network node 210, the transmitting network node 210 will have at least two antennas.

The network node 210 is the transmitting network node, in the sense that it has data available for transmission to network node 240. Correspondingly, network node 240 is the receiving network node in the sense that it will receive data from network node 210. However, it is to be understood that both network nodes 210 and 240 perform both transmission and reception of signals.

The wireless communications system 200 may be any OFDM-based system, such as an Evolved Universal Terrestrial Radio Access Network (E-UTRAN), also known as the Long Term Evolution (LTE). In the following disclosure, the wireless communications system 200 will be exemplified as a MIMO DFTS-OFDM system.

The transmitting network node 210 may be a mobile terminal, such as a user equipment, Personal Digital Assistant (PDA), portable computer or any other equipment capable of transmitting precoded signals.

The receiving network node 240 may be a radio base station, such as an evolved NodeB (eNodeB) or any other type of radio base station utilizing OFDM.

However, it is emphasized that the present solution is applicable in the downlink as well as the uplink direction. Thus, the transmitting network node 210 may be a mobile terminal, and the receiving network node 240 may be a radio base station. Alternatively, the transmitting network node 210 may be a radio base station, and the receiving network node 240 may be a mobile terminal.

An exemplary embodiment of the transmitting network node 210 according to the present solution will now be described in connection with FIG. 2 and FIG. 3.

Figure 3:
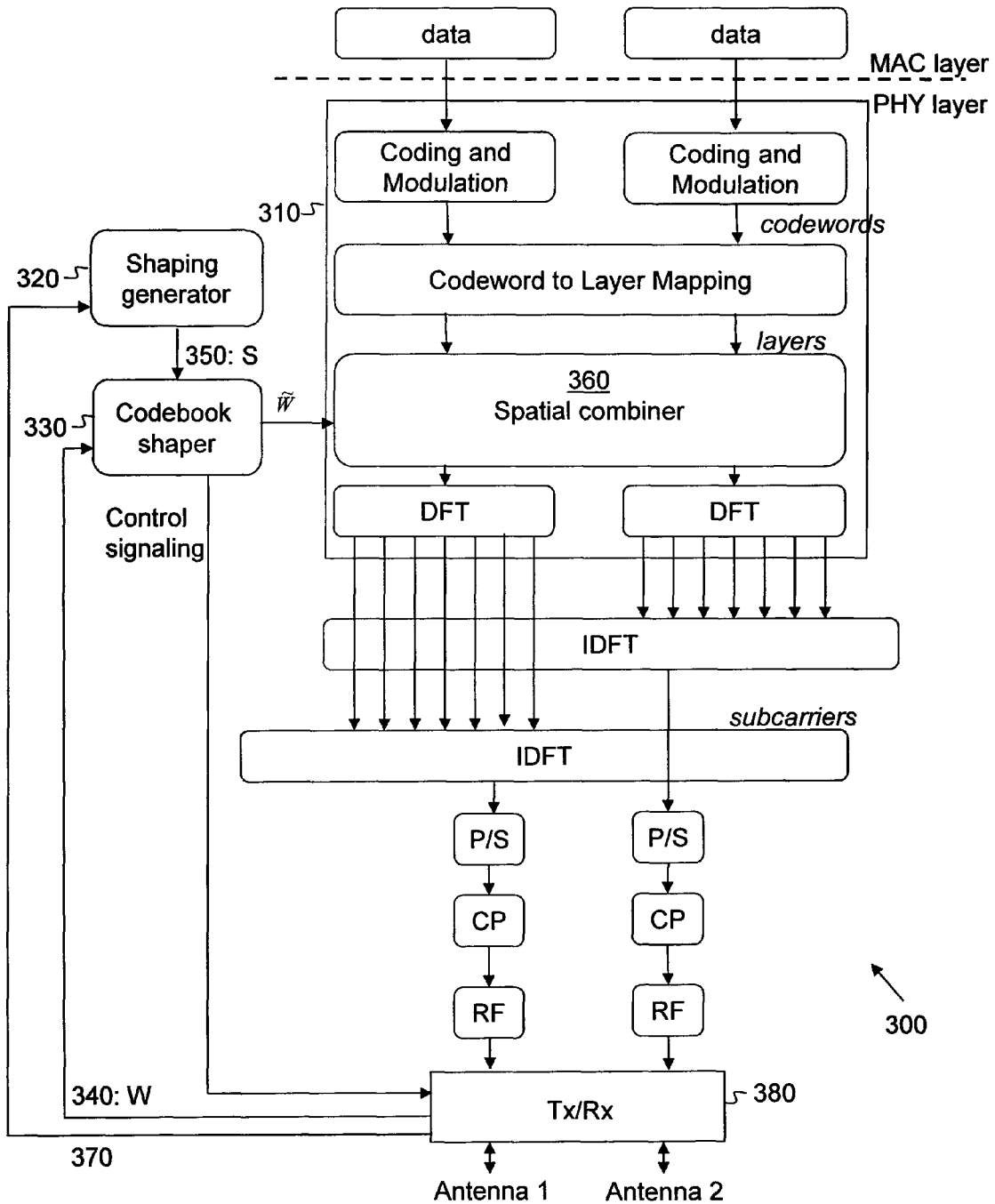
FIG. 3 is a schematic diagram illustrating a MIMO DFTS-OFDM system according to an embodiment of the present invention.

FIG. 3 is a schematic diagram showing a MIMO DFTS-OFDM transmitter 300. The transmitter 300 may be comprised in the transmitting network node 210 shown in FIG. 2. The transmitter 300 comprises a transmitting and receiving unit 380, and a precoding unit 310. The transmitter 210 further comprises a shaping matrix generating unit 320 and a codebook shaping unit 330.

The transmitting and receiving unit 380 receives and transmits signals via the two antennas, denoted Antenna 1 and Antenna 2.

The codebook shaping unit 330 receives as input 340 the original, unitary precoder W, and as input 350 a shaping matrix S. The original precoder W is normally signalled from the receiving node 240, shown in FIG. 2, as indicated by input 340 coming from the transmitting and receiving unit 380. The shaping matrix S is received from the shaping matrix generating unit 320, indicated by input 350. The shaping matrix generating unit 320 will be further described below. The codebook shaper 330 is configured to determine a modified precoder $\tilde{W}$ by calculating the element wise product, also referred to as the Hadamard product, between the original unitary precoder W and the shaping matrix S. The derived precoder is then normalized to a power constraint. If S consists of all ones, the modified precoder coincides with the original one.

The modified precoder $\tilde{W}$ is thus determined as $\tilde{W}=W \otimes S/\|W \otimes S\|$. Here, $\otimes$ indicates the Hadamard elementwise matrix product. The codebook shaping unit sends the modified precoder $\tilde{W}$ as input to the spatial combiner 360 which is comprised in the precoding unit 310. Thus, the spatial combiner 360 will use the modified precoder $\tilde{W}$ instead of the original precoder W for adapting, or precoding, the signal.

The codebook shaping unit 330 is connected to the shaping matrix generating unit 320. The shaping matrix generating unit 320 receives input 370 comprising information related to the status of power control, the selected spatial combiner W, and possibly also the employed modulation format. This information will normally be signalled from the receiving node 240, as shown in FIG. 2, and is supplied via transmitting and receiving unit 380. The output of the shaping matrix generator unit 320 consists of a shaping matrix S with the same dimensions as W. If W is square, S contains ones on the main diagonal and a positive real $0 \le \alpha \le 1$ parameter in all the other positions. If W has a rectangular shape, the design of S is not unique. Apart from trivial transformations, i.e. row/column permutations, the set of matrices S enumerated below has shown to provide a good trade-off between performance and design simplicity. As a general rule, S should contain only one 1 element per row and positive real $0 \le \alpha \le 1$ parameters on all the other elements. This design allows smooth tuning between antenna selection precoders where $\alpha=0$, which implies minimum CM and beamforming gain, and the 3GPP precoder where $\alpha=1$, which implies maximum CM and beamforming gain. Example parameterizations of S are provided here for some cases that are of particular interest for LTE systems. These examples should not be construed as limiting.

$$2 \times 1 \to S = \begin{bmatrix} 1 \\ 1 \end{bmatrix}$$

$$2 \times 2 \to S = \begin{bmatrix} 1 & \alpha \\ \alpha & 1 \end{bmatrix}$$

$$4 \times 1 \to S = \begin{bmatrix} 1 \\ 1 \\ 1 \\ 1 \end{bmatrix}$$

$$4 \times 2 \to S = \begin{bmatrix} 1 & \alpha \\ 1 & \alpha \\ \alpha & 1 \\ \alpha & 1 \end{bmatrix}$$

$$4 \times 3 \to S = \begin{bmatrix} 1 & \alpha & \alpha \\ \alpha & 1 & \alpha \\ \alpha & \alpha & 1 \\ \alpha & \alpha & 1 \end{bmatrix}$$

$$4 \times 4 \to S = \begin{bmatrix} 1 & \alpha & \alpha & \alpha \\ \alpha & 1 & \alpha & \alpha \\ \alpha & \alpha & 1 & \alpha \\ \alpha & \alpha & \alpha & 1 \end{bmatrix}$$

The value of $\alpha$ controls the shaping of the precoder and is a function of power control, and possibly of the modulation format. Suitable values of $\alpha$ can be stored in a table as a function of power control, and possibly modulation format: when high transmitting power is needed, i.e., the system is power limited, a small value of $\alpha$ is selected, which leads to reduced CM and power derating and allows to efficiently exploit the Power Amplifier. To clarify why this is the case, consider the case of $\alpha=0$. Then, the modified precoder becomes an "antenna selection" type of precoder, meaning that only one stream is transmitted per antenna. Thereby, stream mixing, which increases CM, is completely avoided.

On the other hand, when lower transmission power is needed $\alpha$ is set to 1 and the full beamforming gain of the 3GPP codebook is exploited. Adaptation with respect to the modulation format is also possible, since the relative increase of CM due to 3GPP beamforming is, e.g., larger for QPSK than for 64QAM, as is visible in FIG. 14.

When $\alpha \neq 1$ the system will use a modified precoder in place of the standardized 3GPP precoder. This means that the employed spatial processing is not 3GPP compliant. In this case, a dedicated signaling may be provisioned where information about the modified combiner is communicated to the receiver, i.e. the receiving node 240. This will affect the signalling protocol.

One possibility would be to directly signal $\alpha$, which however may be costly in terms of required signalling bandwidth. Another possibility is that the transmitting node 210, e.g. mobile terminal, implicitly sets $\alpha$ based on a parameter known by both the transmitting node 210, e.g. mobile terminal, and the receiving node 240, e.g. base station. One such parameter could be the transmit power control command included in the scheduling grant or a quantity derived thereof. Another possibility is to base $\alpha$ on the latest power headroom report that was sent from the transmitting node 210, e.g. UE to the network or a quantity derived thereof. Basing $\alpha$ on the power headroom may be beneficial since it is in an indication of the available transmit power at the transmitting node 210.

If $\alpha$ is derived from a parameter known to both nodes, only a single bit value is needed to inform the receiving node 240, e.g. base station, that the transmitting node 210, e.g. UE, uses a modified precoder.

Yet another possibility is that the receiving node 240 determines that a modified precoder should be used. The receiving node 240 is aware of the transmit power requirements of the transmitting node 210, since the receiving node 240 is responsible for determining the power control commands for the transmitting node 210. Therefore, the receiving node 240 is also capable of making the decision to use a modified precoder. In this case, the receiving node 240 may signal the modified precoder to the transmitting node 210, in a similar way as already described above.

It should be noted that the remaining components shown in FIG. 3, e.g. the Coding and modulation units, the DFT precoders and the IDFT modulators, are well known in conventional DFTS-OFDM systems, and will thus not be further described here.

Figure 4:
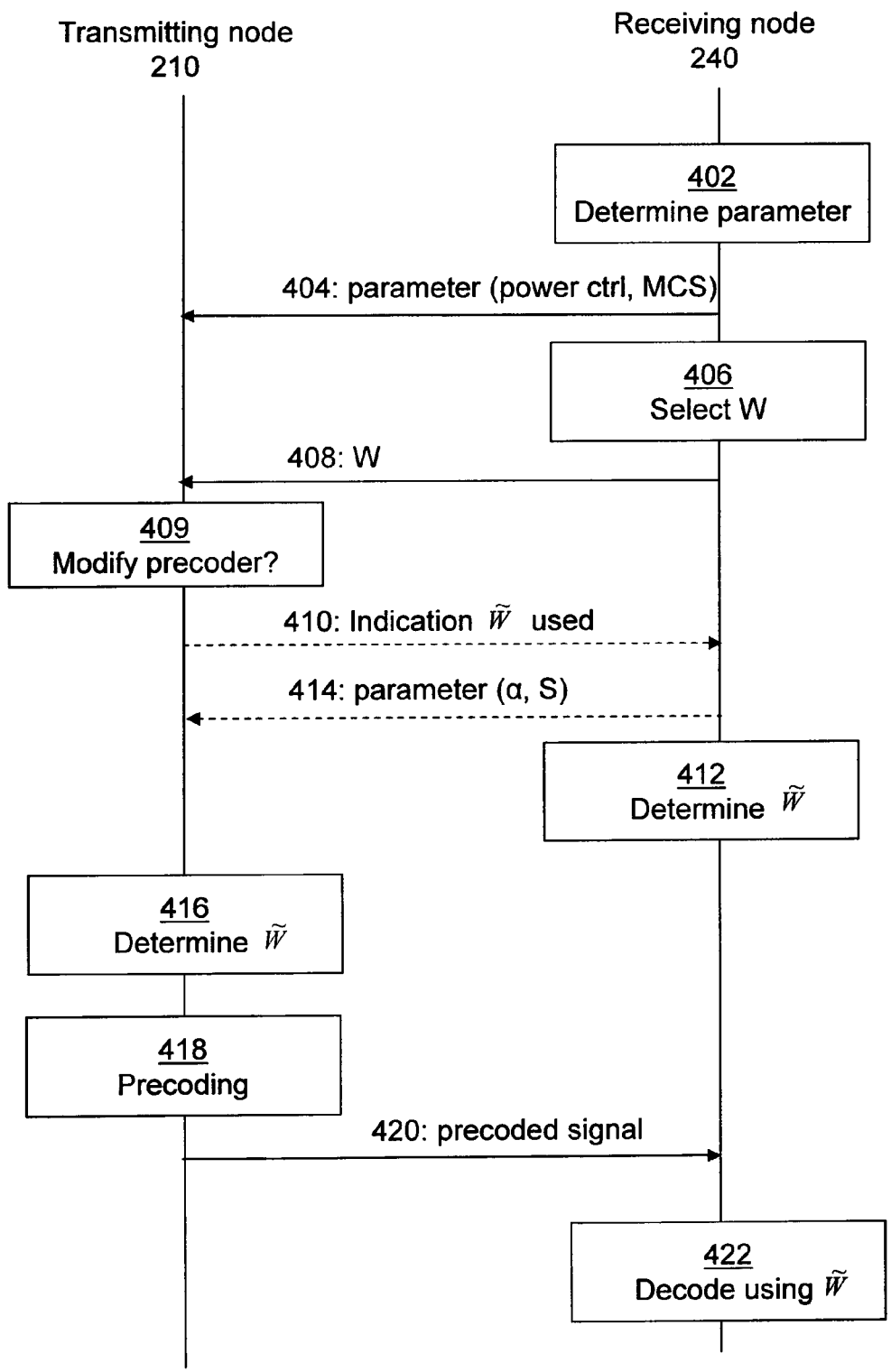
FIG. 4 is a combined signalling scheme and flow chart illustrating a method according to an embodiment of the present invention.

FIG. 4 is a combined signalling diagram and flowchart, illustrating how a signal is adapted (precoded) and then transmitted from a transmitting node 210 to a receiving node 240 according to some embodiments of the invention.

In a first step 402, the receiving node 240 determines at least a first parameter which is related to the transmit power requirements of the transmitting node 210. For instance, the parameter may comprise a power control command for the transmitting node 210. Alternatively, the parameter may be based on the latest power headroom report that was send from the transmitting node 210, as already mentioned above.

Next, the receiving node 240 signals the at least first parameter, determined in step 402, to the transmitting node 210 in a message 404.

In step 406, the receiving node 240 selects an appropriate precoder W from the codebook in the conventional manner, i.e. based on channel characteristics.

The receiving node 240 sends a second parameter, indicating the selected precoder W, to the transmitting node 210 in a message 408. Thus, message 408 is the conventional step of recommending a precoder to the transmitter.

In step 409, the transmitting node 210 determines whether to use a modified precoder. This determination is based on the at least one parameter received in step 404, i.e. based on the transmit power requirements of the transmitting node 210. According to one embodiment, the transmitting node 210 decides to use a modified precoder if the at least one parameter indicates that the transmit power should be above a certain predefined threshold.

The receiving node 240 proceeds to determine the modified precoder $\tilde{W}$, using as input the precoder W and the at least first parameter related to the transmit power requirements of the transmitting node 210. The process of determining the modified precoder $\tilde{W}$ has already been described above in connection with FIG. 3.

In an optional step 414, the receiving node 240 signals one or more parameters that may be used to determine the modified precoder $\tilde{W}$. For instance, the receiving node 240 may signal a factor $\alpha$, or a parameter indicating the shaping matrix S. This step is optional because the transmitting node 210 may also derive these parameters on its own, using the at least one parameter signalled in step 404.

The transmitting node 210 determines the modified precoder $\tilde{W}$ in a step 416. The precoder W which was received in step 408 is used as input, as well as the at least first parameter related to the transmit power requirements which was received in step 404. Any parameters signalled in optional step 414 are also taken into account for determining $\tilde{W}$. The process of determining the modified precoder $\tilde{W}$ has already been described above in connection with FIG. 3.

In step 418, the signal to be transmitted is adapted at the transmitting node 210 for multi-antenna transmission, i.e. precoded, using the modified precoder $\tilde{W}$ determined in step 416.

The precoded signal is then transmitted from the transmitting node 210 to the receiving node 240 in a step 420.

In a final step 422, the receiving node 240 decodes the received signal using the modified precoder $\tilde{W}$, which it determined in step 412.

It should be noted that some of the above steps may be performed in a different order than shown in FIG. 4. In particular, step 409 (determining whether to use a modified precoder) may be performed prior to, or in parallel to, steps 406-408.

A further embodiment of the present invention will now be described. This embodiment is based on the embodiment described above in connection with FIG. 4. In this embodiment, the transmitting node 210 transmits an indication that a modified precoder will be used to adapt said signal for multi-antenna transmission in a message 410. The indication is used to inform the receiver that it will also need to use a modified precoder to decode the signal. It should be noted that message 410 is not essential to the working of the invention, because the receiving node 240 could also determine on its own whether a modified precoder will be used, provided that the receiving node 240 is preconfigured to use the same criteria as the transmitting node 210 (see step 409 described above). The message 410 is transmitted after step 409 has been performed.

All other method steps and messages in this embodiment correspond to those of the embodiment described above.

Figure 5:
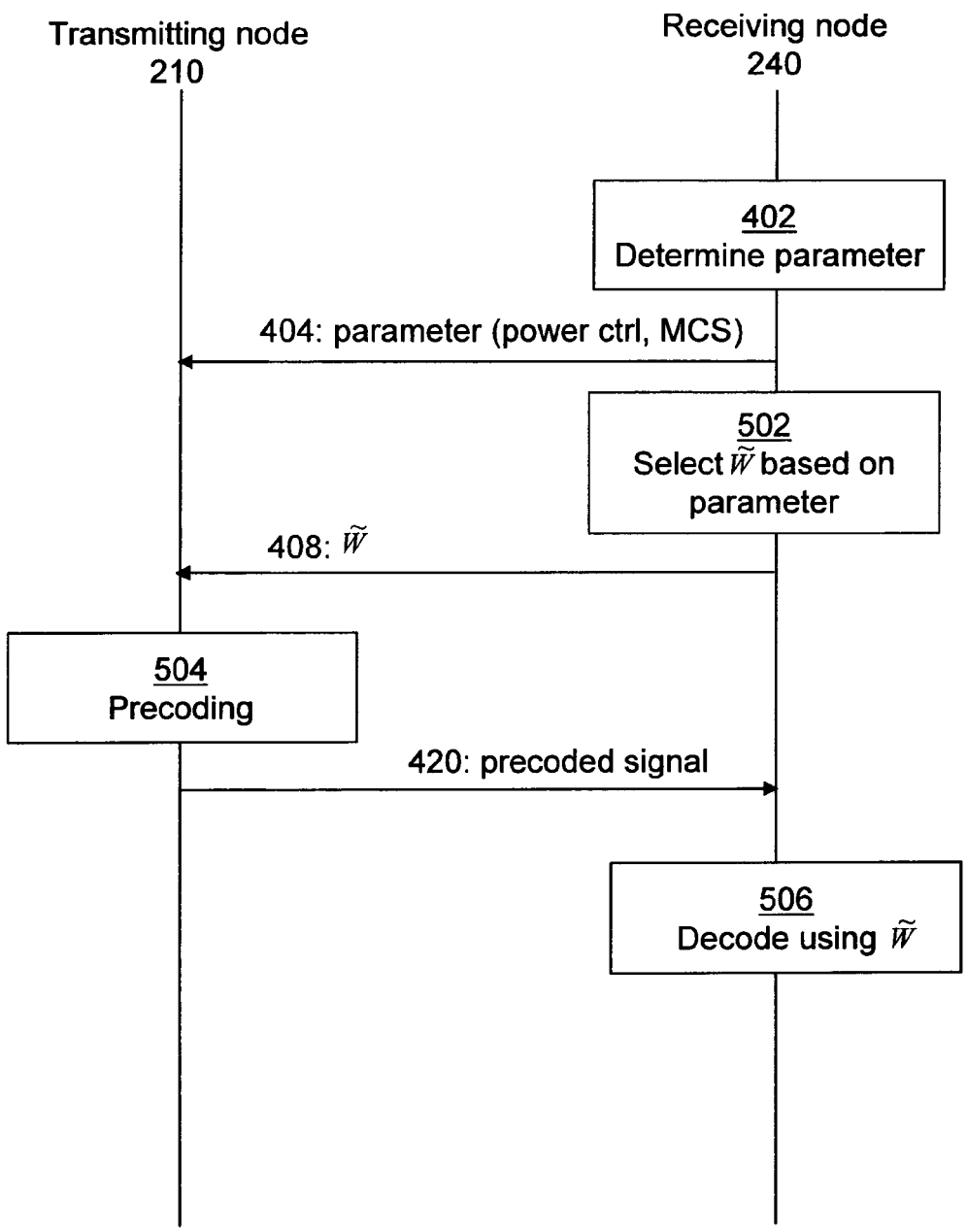
FIG. 5 is a combined signalling scheme and flow chart illustrating a method according to an embodiment of the present invention.

FIG. 5 is a combined signalling diagram and flowchart, illustrating precoding and transmission of a signal from a transmission node 210 to a receiving node 240 according to another embodiment of the present invention.

In the embodiment of FIG. 5, the standard codebook comprises at least one precoder which is already adapted to the transmit power requirements of the transmitting node 210. That is to say, at least one modified precoder has been pre-generated based on at least one conventional precoder W, and the modified precoder has then been stored in the codebook. Based on an input parameter related to the transmit power requirements of the transmitter, e.g. a power control value, the receiver may select the correct modified precoder, for instance based on a lookup table.

The first steps 402 and 404 are the same as in FIG. 4; the receiving node 240 determines at least a first transmit power-related parameter and sends the parameter to the transmitting node 210.

In a step 502, the receiving node 240 selects a precoder $\tilde{W}$ based on the at least first parameter determined in step 402. Note that, as described above, in this case the precoder $\tilde{W}$ is already adapted to the transmit power requirements of the transmitting node 210. Therefore, the precoder $\tilde{W}$ will be used for encoding the signal at the transmitting node 210, and also for decoding the signal at the receiving node 240.

As in FIG. 4, the selected precoder $\tilde{W}$ is signalled to the transmitting node 210 in a step 408.

In step 504, the signal to be transmitted is adapted at the transmitting node 210 for multi-antenna transmission, i.e. precoded, using the precoder $\tilde{W}$ selected in step 502. As mentioned above, this precoder is already modified based on the transmit power requirements of the transmitting node 210.

The precoded signal is then transmitted from the transmitting node 210 to the receiving node 240 in a step 420.

In a final step 506, the receiving node 240 decodes the received signal using the selected precoder $\tilde{W}$.

As can be seen from the above, according to this embodiment no dedicated signalling is required. Furthermore, no change is required to the transmitting node 210. However, the codebook has been modified, and the receiving node 240 is also modified to take into account the power requirements of the transmitting node 210 when selecting the precoder.

Figure 6:
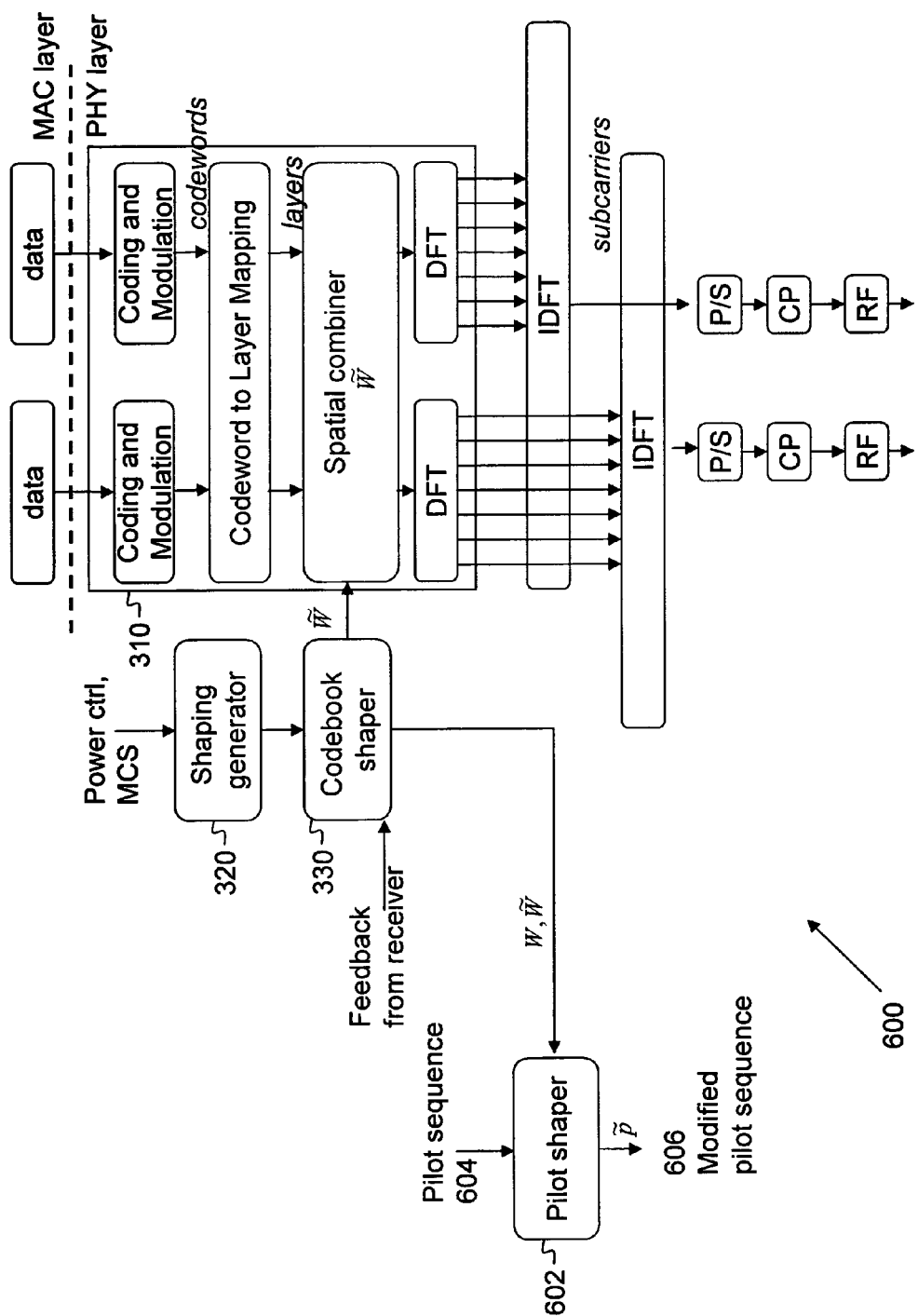
FIG. 6 is a schematic diagram illustrating a MIMO DFTS-OFDM system according to an embodiment of the present invention.

A further embodiment of the invention will now be described with reference to FIG. 2 and FIG. 6. FIG. 6 is a schematic diagram depicting a DFTS-OFDM transmitter 600. The transmitter 600 may be comprised in the transmitting node 210 shown in FIG. 2. According to the present embodiment, dedicated signalling and modifications of the standard, such as modification of the codebook, may be avoided.

In this embodiment, the pilot tones used for demodulation are modified in order to let the receiver, i.e. the receiving node 240, estimate a distorted channel instead of the actual channel 260. The pilot tones are only modified when a modified precoder is used, that is, when $\alpha \neq 1$.

The transmitter 600 is similar to the transmitter 300 shown in FIG. 3. However, the transmitter 600 further comprises a Pilot shaping unit 602, which is configured to modify the pilot tones. Let p be the Ntx×1 vector of demodulation pilot tones transmitted on a given subcarrier, i.e., the pilot tones that are used at the receiver for channel estimation. The pilot shaping unit 602 then takes the pilot sequence p as input, 604. The pilot shaping unit 602 then modifies the pilot sequence p as $$\tilde{p} = \tilde{W}W^H p,$$

where W is the conventional spatial combiner, $\tilde{W}$ is the modified spatial combiner. The pilot shaping unit 602 receives W and $\tilde{W}$ from the codebook shaping unit 330. Alternatively, W may be received from another unit, e.g. the shaping matrix generating unit 320 or directly from the receiving node 240. Superscript H indicates the Hermitian transpose.

In this case the channel estimated by the receiver, i.e. the receiving node 240, is $\tilde{H} = H\tilde{W}W^H$ instead of the actual channel H. Since the receiver assumes that combiner W is used on the transmitted data, even though $\tilde{W}$ is actually employed, and furthermore $W^H W = I$ holds for the 3GPP codebook, the receiver assumes that data symbols are transmitted on the equivalent channel $$\tilde{H}W = H\tilde{W}W^H W = H\tilde{W}$$

and the equalizer at the receiver is able to perform correct reception based on the assumption that the conventional precoder W was used at the transmitter.

The present embodiment does not require any additional signalling, because the modified pilot sequence will cause the receiver to correctly decode the signal. However, in some embodiments the transmitting node 210, e.g. a mobile terminal, comprising the transmitter 600, also signals to the receiving node 240, e.g. a base station, that the transmitting node 210 applies $\tilde{W}$ instead of W.

This may for instance be required if the base station may perform averaging in time across pilot signals—which is not possible with adaptively precoded pilots—and must therefore be prevented.

In a further embodiment, the transmitting node 210, e.g. mobile terminal, signals—as above—to the receiving node, e.g. base station, that it uses a modified precoder, i.e. that it applies $\tilde{W}$ instead of W. The value $\alpha$ is again based on a parameter known by both nodes—e.g. latest power headroom report—enabling the receiving node 240, e.g. base station, to construct the pilot applied by the transmitting node 210, e.g. mobile terminal.

An advantage of this embodiment is that the receiving node 240, e.g. base station, keeps control of what type of precoding is applied by the transmitting node 210, e.g. mobile terminal, allowing it to estimate a "non shaped" channel if needed.

A further advantage of this embodiment is that channel estimation at the receiving node 240, e.g. base station, becomes easier also in case of abrupt change of the precoder used by the transmitting node 210, e.g. mobile terminal, possibly allowing interpolation of the channel between subframes.

Figure 7:
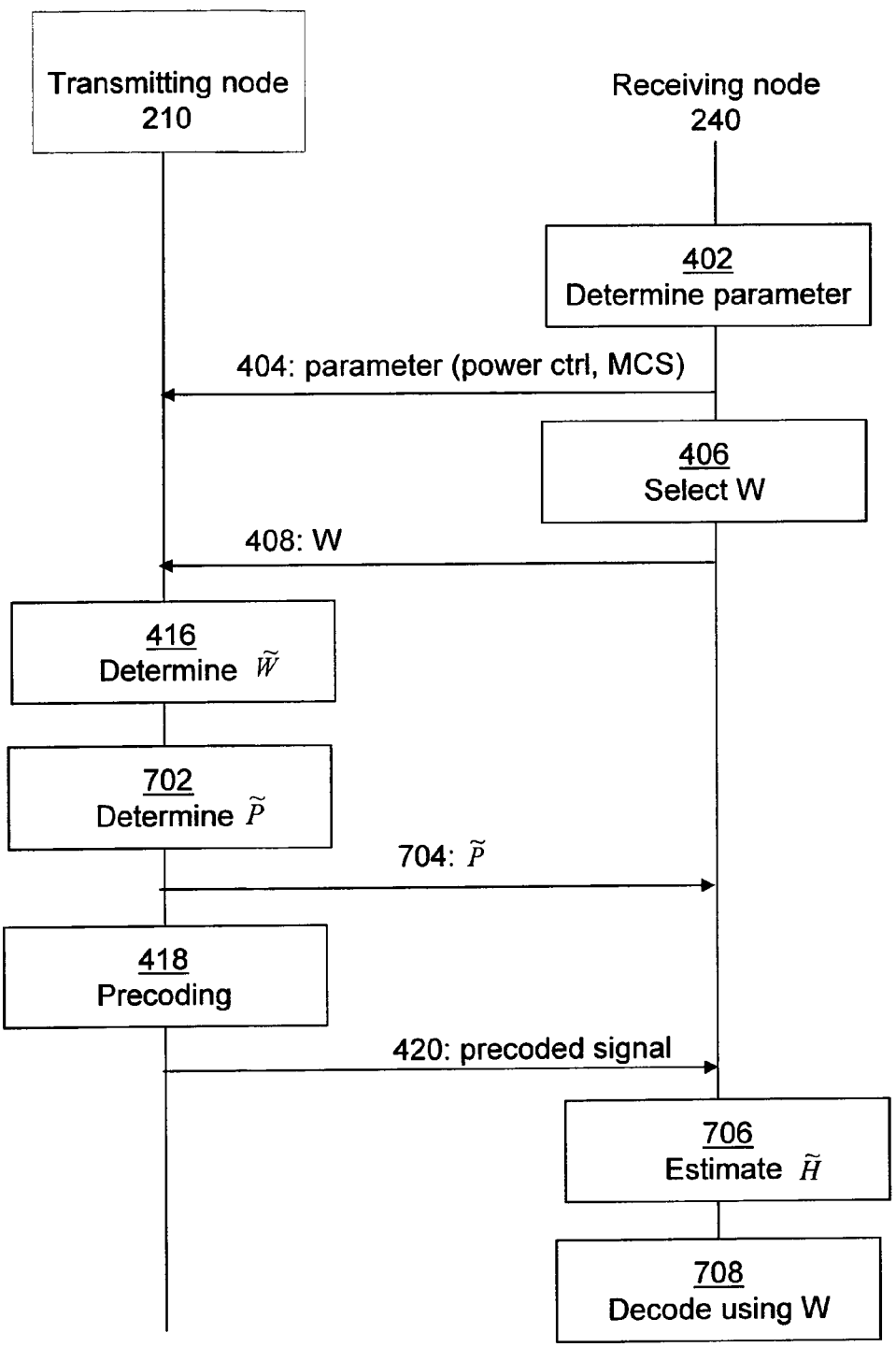
FIG. 7 is a combined signalling scheme and flow chart illustrating a method according to an embodiment of the present invention.

A method, which may be performed by the DFTS-OFDM transmitter 600 of FIG. 6, will now be described with reference to FIG. 7. FIG. 7 is a combined signalling diagram and flow chart, illustrating the precoding and transmission of a signal from a transmitting node 210 to a receiving node 240, using a modified pilot sequence.

Steps 402-408 correspond to those described above in connection with FIG. 4. The receiving node 240 determines at least a first parameter related to the power transmit requirements of the transmitting node 210, sends the parameter to the transmitting node, then selects a precoder W and indicates the selected precoder to the transmitting node 210.

In a step 416, the transmitting node 210 then determines a modified precoder $\tilde{W}$ in the same manner as described above, i.e. using the selected precoder W and the parameter or parameters received in step 404.

In a further step 702, the transmitting node 210 determines a modified pilot sequence $\tilde{p}$ as described above in connection with FIG. 6.

The transmitting node 210 transmits the modified pilot sequence $\tilde{p}$ in a step 704.

In step 418, the data signal to be transmitted is precoded at the transmitting node 210, using the modified precoder $\tilde{W}$.

The transmitting node 210 transmits the precoded signal in step 420.

In step 706, the receiving node 240 receives the modified pilot sequence $\tilde{p}$ and uses it to estimate the channel. Since the pilot sequence was modified, the receiving node 240 will estimate a distorted channel $\tilde{H}$ instead of the actual channel H, as already described above.

Finally, the receiving node 240 decodes the signal using the original precoder W and the estimated channel $\tilde{H}$ in a step 708.

It should be noted that some of the described steps may be performed in a different order. In particular, steps 702-704 (determining and transmitting the modified pilot sequence) may be performed in parallel to, or after step 418 (precoding the signal).

For the sake of clarity, it is pointed out that the receiving node 240 performs the step of estimating the channel also in the embodiments of FIGS. 4 and 5, and that the estimated channel H is used in decoding steps 422, 506. These conventional channel estimation and decoding steps will not be described in detail, as they are well known in the art and not essential for the understanding of the invention.

Figure 8:
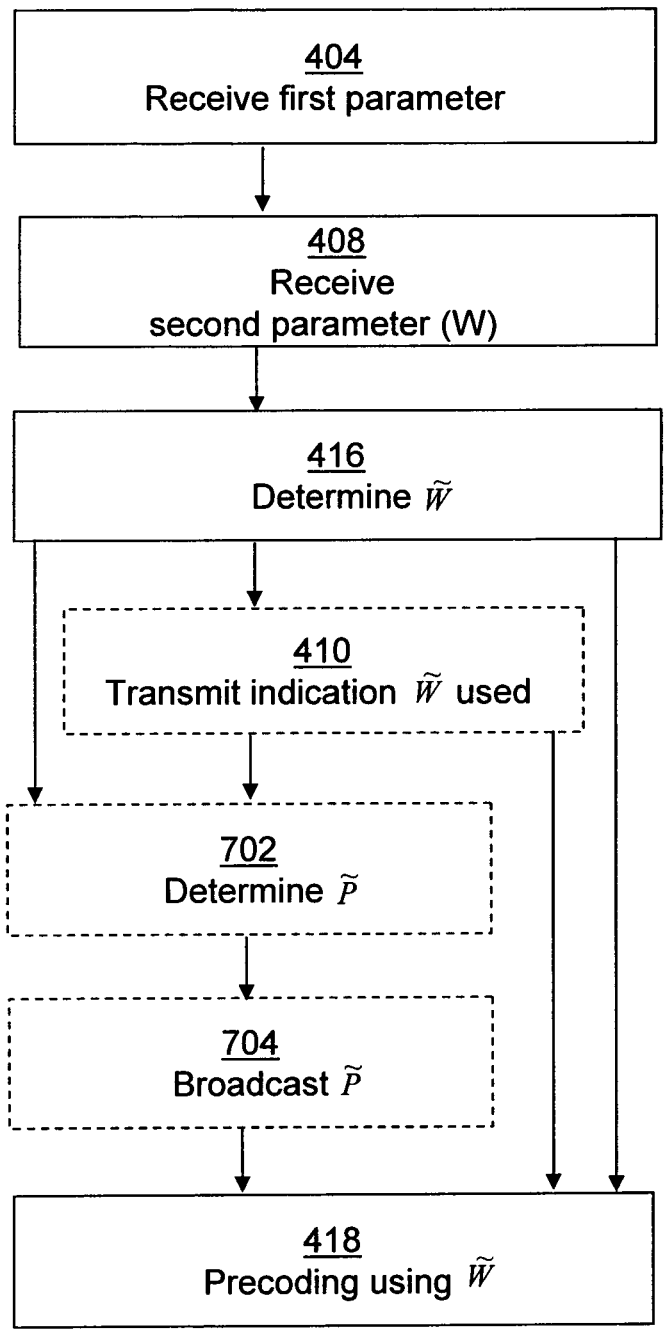
FIG. 8 is a flow chart illustrating a method in a transmitting network node according to an embodiment of the present invention.

A method in the transmitting network node 210 for adapting a signal for multi-antenna transmission according to an embodiment of the invention will now be described with reference to the flow chart depicted in FIG. 8. As mentioned above, the network node 210 is comprised in a wireless communications network 200. In some embodiments, the network node 210 is a mobile terminal, e.g. a user equipment, portable computer or the like. In some other embodiments, the network node 210 is a radio base station, e.g. an eNodeB.

The method comprises the following steps.

The network node 210 receives at least a first parameter, which is related to the transmit power requirements of the network node 210 in a step 404.

The at least first parameter may comprise a power control command.

In some embodiments, the at least first parameter further comprises an indication of a modulation coding scheme.

The network node 210 receives a second parameter indicating a precoder W in a step 408.

The network node 210 determines a modified precoder $\tilde{W}$, which has the same dimensions as W. The modified precoder $\tilde{W}$ is determined using the precoder W and the at least first parameter in a step 416.

In a step 418, the network node 210 adapts, or precodes, the signal to be transmitted for multi-antenna transmission using the modified precoder $\tilde{W}$ determined in step 416.

Optionally, the network node 210 transmits an indication that a modified precoder is used to adapt said signal for multi-antenna transmission in a step 410. This will indicate to the receiving node 240 that it will also need to use a modified precoder for decoding the signal.

In an optional step 702, the transmitting node 210 may modify at least one pilot signal using the precoder W and the modified precoder $\tilde{W}$, thus determining a modified pilot sequence $\tilde{p}$.

The step of modifying the at least one pilot signal may comprise multiplying the at least one pilot signal with the hermitian transpose of the precoder W and with the modified precoder $\tilde{W}$;

If step 702 was performed, the transmitting node will proceed to transmit the at least one modified pilot signals $\tilde{p}$ in a step 704.

According to one particular embodiment, optional steps 410, 702 and 704 are all performed. As mentioned above, although additional signalling is not necessary if a modified pilot signal is transmitted, it can sometimes be beneficial to do so.

Figure 9:
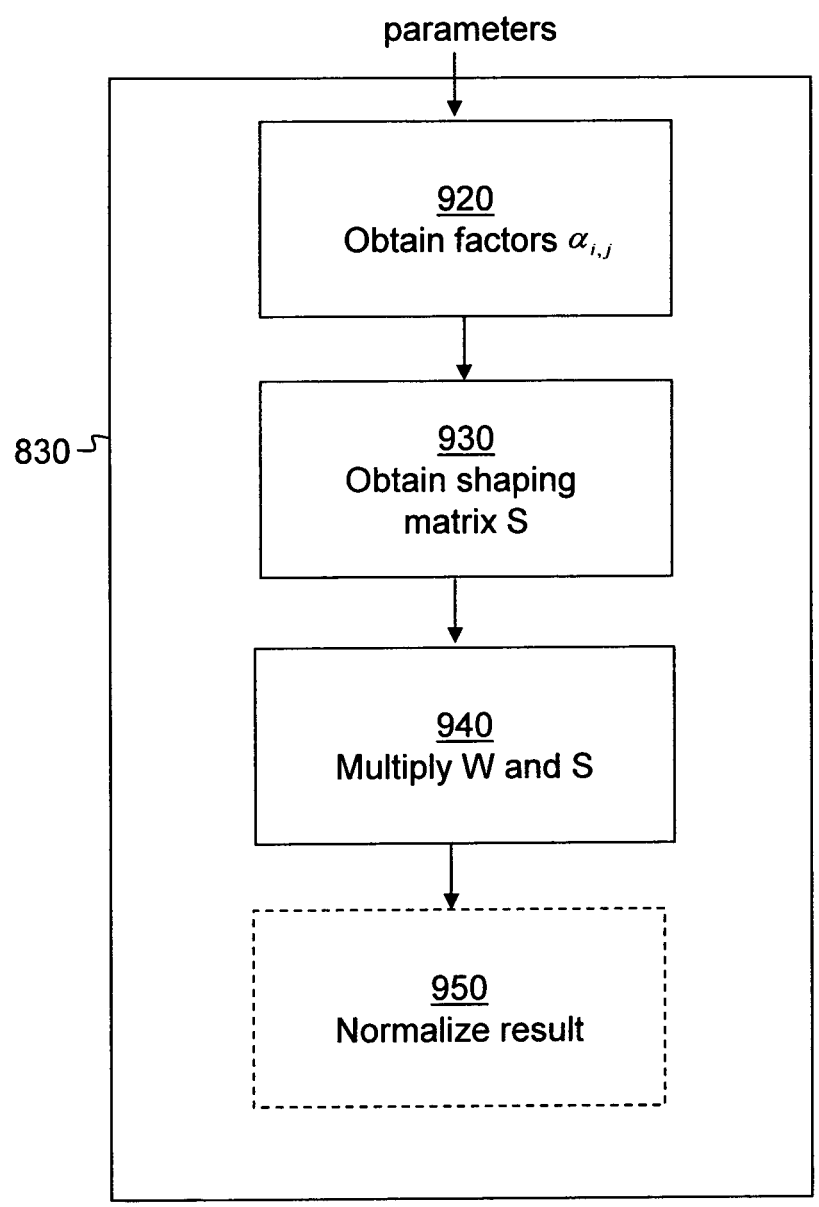
FIG. 9 is a flow chart illustrating a method according to an embodiment of the present invention.

With reference to the flowchart in FIG. 9, the process of determining the modified precoder $\tilde{W}$ (step 416 above) according to exemplary embodiments will now be described in more detail.

As mentioned above, the modified precoder $\tilde{W}$ is determined based on the original precoder W, and the at least first parameter, wherein the at least first parameter is related to the transmit power requirements of the network node 210.

In some embodiments, the modified precoder $\tilde{W}$ is determined such that each element $\tilde{w}_{i,j}$ in $\tilde{W}$ equals the corresponding element $w_{i,j}$ in W multiplied by a factor $s_{i,j}$. The factor $s_{i,j}$ is chosen depending on the value of the at least first parameter. For instance, the factor $s_{i,j}$ could be retrieved from a lookup table based on a power control value and/or an indicated modulation coding scheme.

The factor $s_{i,j}$ is chosen such that it is less than or equal to one, and greater than or equal to zero. That is, each element in the matrix W is scaled by a real factor $0 \leq s_{i,j} \leq 1$.

It should be noted that some or all of the factors $s_{i,j}$ may be the same.

The case where one factor $s_{i,j}$ in each row equals 1, and all other factors $s_{i,j}$ are the same real factor $0 \leq s_{i,j} < 1$, corresponds to the embodiment described above in connection with FIG. 3. That is to say, each factor $s_{i,j}$ is either equal to 1, or equal to a factor $\alpha$, where $0 \leq \alpha < 1$.

In some embodiments, determining the modified precoder $\tilde{W}$ comprises the following steps:

In an optional step 920, a factor $\alpha$ is obtained. According to one particular embodiment, the receiving node 240 signals the factor $\alpha$. According to another embodiment, the receiving node 240 signals an index into a lookup table where the factor $\alpha$ is stored.

In a step 930, a shaping matrix S, having the same dimensions as W is determined. The shaping matrix S is determined such that each element $s_{i,j}$ of S depends on the value of the at least first parameter, e.g. a power control value and/or indicated modulation coding scheme. Furthermore, $0 \leq s_{i,j} \leq 1$.

In a variant of this embodiment, the shaping matrix S is received as a parameter instead of being determined. For instance, the receiving node 240 may signal S, either by itself or as an index into a lookup table.

In a step 940, the modified precoder $\tilde{W}$ is determined as the element-wise product (Hadamard product) of S and W.

In an optional step 950, the result is normalized to a power constraint. Specifically, each element of $\tilde{W}$ is multiplied by a scalar factor in order to normalize the power to the desired level. Note that this step is optional, because the shaping matrix S may in itself be normalized.

Figure 10:
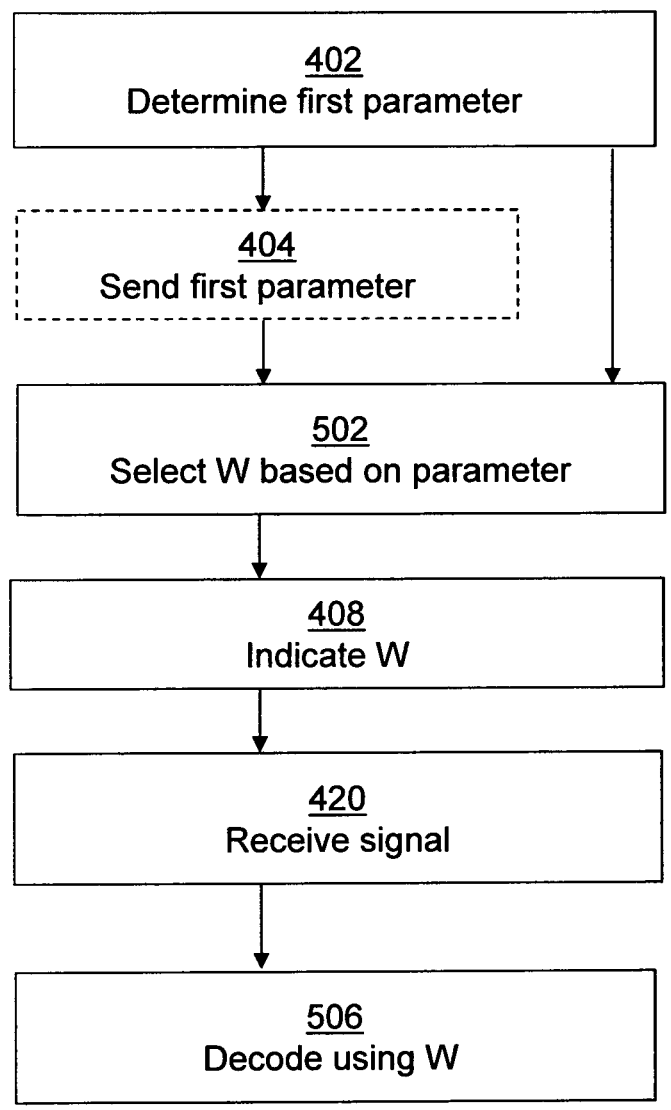
FIG. 10 is a flow chart illustrating a method in a receiving network node according to an embodiment of the present invention.

Method steps in the receiving network node 240 for decoding a signal received from a transmitting node 210 according to an embodiment of the invention will now be described with reference to the flow chart depicted in FIG. 10. The received signal is adapted for multi-antenna transmission, i.e. precoded, by the transmitting node 210. As mentioned above, the receiving network node 240 and the transmitting network node 210 are comprised in a wireless communications network 200. In some embodiments, the network node 240 is a mobile terminal, e.g. a user equipment, portable computer or the like. In some other embodiments, the network node 240 is a radio base station, e.g. an eNodeB.

According to the present embodiment, the conventional codebook used for precoding signals, e.g. the standardized 3GPP codebook, is modified, such that the codebook comprises at least one precoder which is already adapted to the transmit power requirements of the transmitting node 210. That is to say, at least one modified precoder has been pre-generated based on at least one conventional precoder W, and the modified precoder has then been stored in the codebook. Based on an input parameter related to the transmit power requirements of the transmitter, e.g. a power control value, the receiver may select the correct modified precoder, for instance based on a lookup table. Since the transmitter and receiver both use the same modified codebook, no additional signalling is necessary in this embodiment. The transmitting node 210 will function in the conventional way, since it will simply receive a recommendation for the appropriate precoder to use. The transmitting node 210 will look up this precoder in the modified codebook and use it to adapt the signal.

However, the receiving node 240 is affected, in that the correct precoder is selected based on at least a first parameter related to the transmit power requirements of the transmitting node 210.

The method, according to one embodiment, comprises the following steps.

In a step 402, the receiving network node 240 determines at least a first parameter, which is related to the transmit power requirements of the transmitting node 210. The at least first parameter may comprise a power control command. The at least first parameter may further comprise an indication of a modulation coding scheme to be used by the transmitting node 210. It is well known in the art how to determine a power control command or modulation coding scheme.

In an optional step 404, the receiving network node 240 sends the at least first parameter to the transmitting node 210.

The receiving network node 240 selects a precoder W for decoding, based on the at least first parameter, in a step 502. That is, the appropriate precoder W, which has already been modified depending on the transmit power-related requirement, is selected.

The receiving network node 240 sends a second parameter, indicating the selected precoder W to the transmitting node 210, in a step 408. This step corresponds to the conventional step of "recommending" a precoder for use by the transmitter. It is pointed out that W may be signalled with a lower periodicity than the at least first parameter.

In step 420, the receiving network node 240 receives a signal from the transmitting node 210. This signal has been precoded using the recommended precoder W, signalled in step 408.

Finally, the receiving network node 506 decodes the signal using the selected precoder W.

Figure 11:
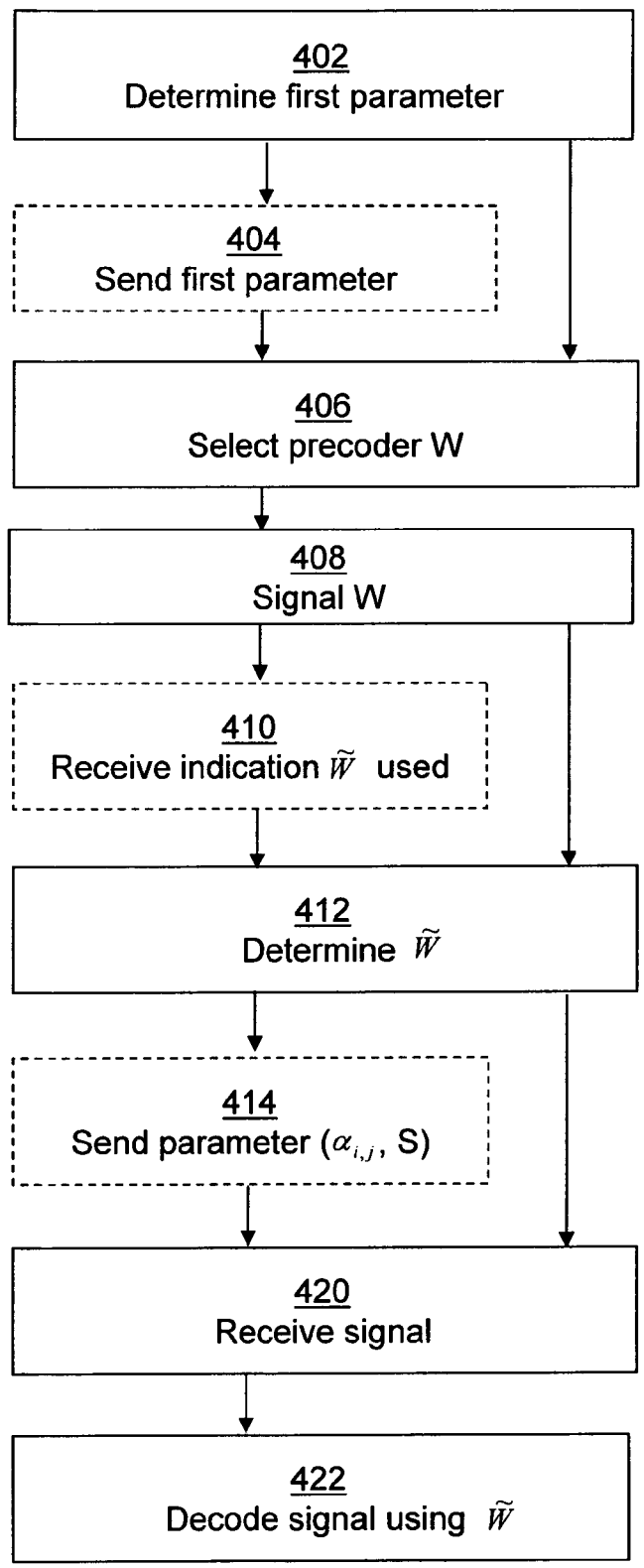
FIG. 11 is a flow chart illustrating a method in a receiving network node according to an embodiment of the present invention.

With reference to FIG. 11, a further embodiment of a method in the receiving network node 240 for decoding a signal received from a transmitting node 210 will now be described. In this embodiment, the codebook is not modified. Instead, the receiving network node 240 calculates a modified precoder based on the original precoder W from the codebook, as will be further described below.

The signal received from the transmitting node 210 is adapted for multi-antenna transmission, i.e. precoded. As mentioned above, the receiving network node 240 and the transmitting network node 210 are comprised in a wireless communications network 200. In some embodiments, the network node 240 is a mobile terminal, e.g. a user equipment, portable computer or the like. In some other embodiments, the network node 240 is a radio base station, e.g. an eNodeB.

The method comprises the following steps.

In steps 402-404, the receiving network node 240 determines at least a first parameter, and optionally sends the at least first parameter to the transmitting node 210. These steps correspond to those described in connection with FIG. 10 above. The at least first parameter is related to the transmit power requirements of the transmitting node 210. In one variant of this embodiment, the at least first parameter is a power control command. In another variant, the at least first parameter is a modulation coding scheme.

In step 406, the receiving network node 240 selects a precoder W for encoding. This precoder is selected from the conventional codebook, i.e. it has not yet been modified with respect to the transmit power requirements of the transmitter.

In step 408, the receiving network node 240 sends a second parameter, indicating the selected precoder W to the transmitting node 210. Again, this step is the same as described in connection with FIG. 10 above.

In an optional step 410, the receiving network node 240 receives an indication that a modified precoder will be used to adapt said signal for multi-antenna transmission. That is to say, the transmitter informs the receiving network node 240 that it has determined that adaptive precoding should be used. The receiving network node 240 then knows that it must also use a modified precoder in order to correctly decode the signal. An advantage of receiving this indication is that the receiving network node 240 does not have to determine itself whether a modified precoder should be used. This will reduce computational complexity in the receiving network node 240.

In step 412, the receiving network node 240 determines a modified precoder $\tilde{W}$ having the same dimensions as W. The modified precoder is determined using the precoder W and the at least first parameter, i.e. a parameter related to the transmit power requirements of the transmitting network node 210.

In a variant of this embodiment, the modified precoder $\tilde{W}$ is determined such that each element $\tilde{w}_{i,j}$ in $\tilde{W}$ equals the corresponding element $w_{i,j}$ in W multiplied by a factor $s_{i,j}$, $0 \leq s_{i,j} \leq 1$. The factors $s_{i,j}$ depend on the value of the at least first parameter.

In a further variant of this embodiment, the step of determining the modified precoder further comprises determining a shaping matrix S, having the same dimensions as W. S is determined such that each element $s_{i,j}$ of S has a value either equal to one, or equal to one multiplied by a factor $\alpha$, wherein the factor $\alpha$ depends on the value of the at least first parameter, and wherein the value of a is less than or equal to one, and greater than or equal to zero. The modified precoder $\tilde{W}$ is then determined as the element-wise product of S and W;

The modified precoder $\tilde{W}$ is selected as the precoder for decoding the signal.

In an optional step 414, the receiving node 240 transmits a third parameter to the transmitting node 210. This third parameter may indicate the factors $\alpha$. In a variant of this embodiment, the third parameter may indicate the shaping matrix S.

Thus, in this step the receiving node 240 signals a parameter to the transmitting node 210, which parameter may be used by the transmitting node 210 to determine the modified precoder $\tilde{W}$ In step 420, the receiving network node 240 receives a signal from the transmitting node 210. This signal has been precoded using the modified precoder $\tilde{W}$.

Finally, the receiving network node 240 decodes the signal using the modified precoder $\tilde{W}$ in step 422.

Figure 12:
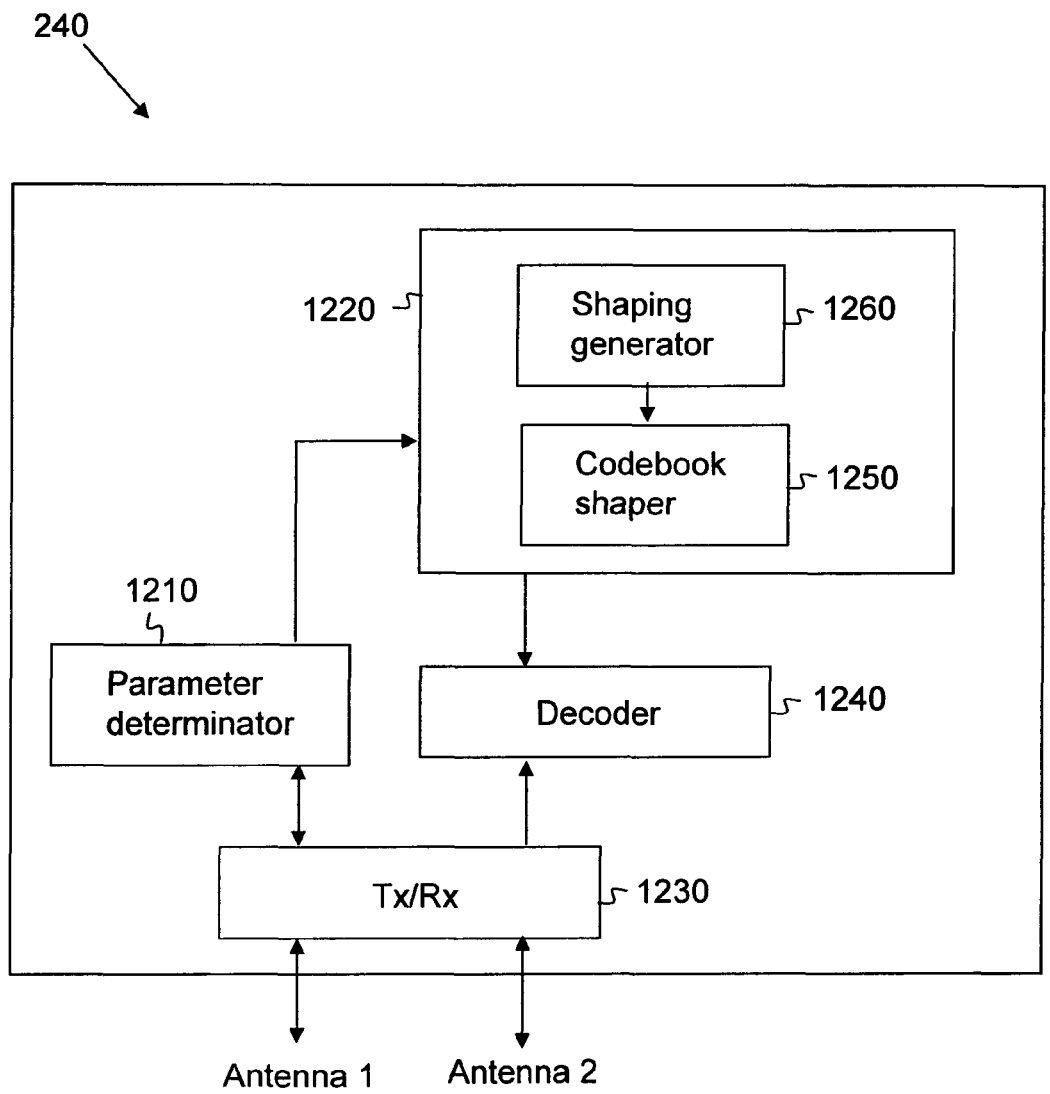
FIG. 12 is a block diagram illustrating receiving network node according to an embodiment of the present invention.

An exemplary embodiment of a receiving node 240 will now be described with reference to FIG. 12. As mentioned above, the receiving node 240 is in communication with a transmitting node 210. The receiving node 240 and the transmitting node 210 are both comprised in a wireless communications network 200. In some embodiments, the receiving node 240 may be a mobile terminal or similar, and in other embodiments, the receiving node 240 may be a base station or similar.

To perform the present method steps for decoding a signal received from the transmitting network node 210, the receiving node 240 comprises a parameter determinator 1210, which is configured to determine at least a first parameter being related to the transmit power requirements of the transmitting node 210. As mentioned above, the at least first parameter may comprise a power control command. In a variant of this embodiment, the at least first parameter further comprises an indication of a modulation coding scheme to be used by the transmitting node 210.

The receiving network node 240 further comprises a precoder selection unit 1220. The precoder selection unit 1220 is configured to select a precoder for decoding, based on the at least first parameter. It should be noted that the estimated channel H is also taken into account. Channel estimation and the use of H in precoder selection is well known in the art and will not be described further here.

In one embodiment, the precoder selection unit 1220 is further configured to select a precoder W for encoding.

In one embodiment, the precoder selection unit 1220 further comprises a codebook shaping unit 1250. The codebook shaping unit 1250 is configured to determine a modified precoder $\tilde{W}$ having the same dimensions as W, using the precoder W and the at least first parameter, and is further configured to select the modified precoder $\tilde{W}$ as the precoder for decoding.

The codebook shaping unit 1250 may be further configured to determine the modified precoder $\tilde{W}$ such that each element $\tilde{w}_{i,j}$ in $\tilde{W}$ equals the corresponding element $w_{i,j}$ in W multiplied by a factor $s_{i,j}$, wherein the factor $s_{i,j}$ depends on the value of the at least first parameter, and wherein the factor $s_{i,j}$ is less than or equal to one, and greater than or equal to zero.

The precoder selection unit 1220 also comprises a shaping matrix generating unit 1260. The shaping matrix generating unit 1260 is configured to determine a shaping matrix S, having the same dimensions as W, such that each element $s_{i,j}$ of S has a value either equal to one, or equal to one multiplied by a factor $\alpha$, wherein the factor $\alpha$ depends on the value of the at least first parameter, and wherein the value of $\alpha$ is less than or equal to one, and greater than or equal to zero. The precoder selecting unit 1220 is further configured to determine a modified precoder $\tilde{W}$ as the element-wise product of S and W, and select the modified precoder $\tilde{W}$ as the precoder for decoding.

The receiving network node 240 further comprises a receiving unit 1230, which is configured to receive a signal from the transmitting node 210.

In some embodiments, the receiving unit 1230 is further configured to receive an indication that a modified precoder has been used to adapt said signal for multi-antenna transmission. This corresponds to method step 410, described above in connection with FIG. 11.

Furthermore, the receiving network node 240 comprises a decoding unit 1240. The decoding unit 1240 is configured to decode the received signal using the selected precoder.

In one embodiment, the network node 240 comprises a transmitting unit 1230. The transmitting unit 1230 is configured to send the at least first parameter to the transmitting node. The transmitting unit 1230 is further configured to send a second parameter indicating the precoder W, which has been selected by the precoder selecting unit 1220, to the transmitting node 210;

In one embodiment, the transmitting unit 1230 is further configured to transmit a third parameter indicating the factor $\alpha$. This corresponds to method step 414, described above in connection with FIG. 11.

In another embodiment, the transmitting unit 1230 is further configured to transmit at least a third parameter indicating the shaping matrix S.

In one embodiment, the transmitting unit 1230 is further configured to send data indicating the selected precoder to the transmitting node 210. This has the advantage that the transmitting node 210 does not have to determine the selected precoder itself.

Figure 13:
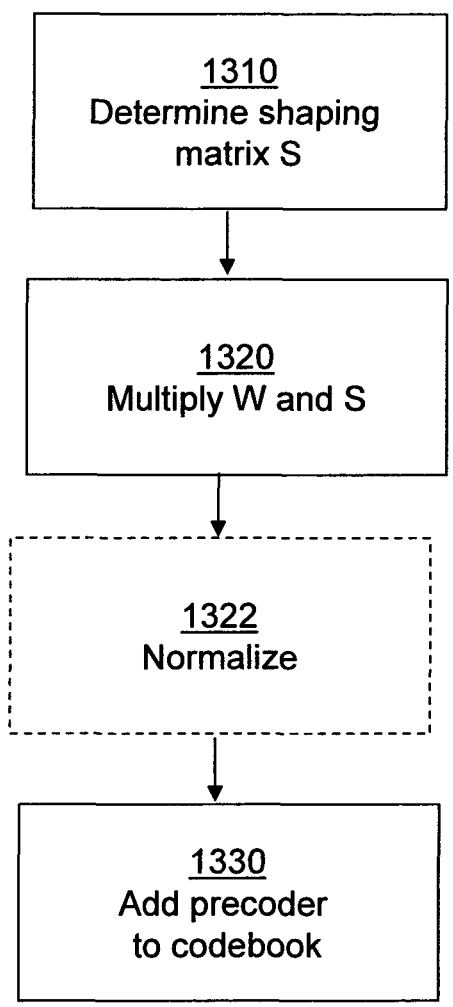
FIG. 13 is a flow chart illustrating a method according to an embodiment of the present invention.

A method of generating a modified codebook for use in adapting a signal for multi-antenna transmission according to an embodiment of the invention will now be described with reference to the flowchart shown in FIG. 13. The modified codebook is generated based on an existing codebook comprising at least one precoder. According to the method, the following steps are performed for at least one precoder $W_n$ in the existing codebook:

Determining, in a step 1310, at least one shaping matrix S, having the same dimensions as the precoder $W_n$. The shaping matrix S is determined such that each element $s_{i,j}$ of S is less than or equal to one, and greater than or equal to zero. As already described in connection with other embodiments above, the values in the shaping matrix S are chosen in such a way as to adapt the precoder to the transmit power requirements of the transmitter. In order to create a codebook that may be used with varying transmit power levels, several different S matrices may be determined, corresponding to different values in transmit power.

In a subsequent step 1320, at least one modified precoder $\tilde{W}_n$ is determined as the element-wise product of the at least one shaping matrix S and $W_n$.

In an optional step 1322, each element of the modified precoder $\tilde{W}_n$ is multiplied by a scalar factor, in order to normalize the power to the desired level.

Finally, the at least one modified precoder $\tilde{W}_n$ is added to the codebook in step 1330. It should be noted that a mapping between a certain transmit power value, and the corresponding modified precoder $\tilde{W}_n$, also needs to be stored. This mapping will be used to select the appropriate precoder from the codebook, based on a parameter related to the transmit power requirements of the transmitter.

In a preferred embodiment, the method steps are performed for all precoders $W_n$ in the existing codebook.

The present mechanism for adapting a signal for multi-antenna transmission may be implemented through one or more processors in network node 210 or network node 240, together with computer program code for performing the functions of the present solution. The program code mentioned above may also be provided as a computer program product, for instance in the form of a data carrier carrying computer program code for performing the present solution when being loaded into the network node 210 or network node 240. One such carrier may be in the form of a CD ROM disc. It is however feasible with other data carriers such as a memory stick. The computer program code can furthermore be provided as pure program code on a server and downloaded to the network node 210 or network node 240 remotely.

In the following sections, the performance of the invention is shown by numerical simulation, with reference to FIG. 14. A system with 4tx antennas using rank 2 transmission is considered. The 3GPP codebook is employed. In order to simplify the simulation, a 4×2 Rayleigh (narrowband) channel is considered with correlated antennas (correlation=0.9). An average SNR of 20 dB is assumed.

The line marked with circles shows the equivalent SNR loss due to beamforming degradation as a function of the parameter α. The performance of the 3GPP codebook is used as the reference for comparison.

The line marked with triangles shows the reduction of CM due to combiner shaping as a function of α. On a first approximation the reduction of CM can be mapped in a corresponding reduction of power derating in the PA. In other words a larger transmission power may be employed without violating distortion constraints.

The dashed line shows the difference between the CM gain and the SNR loss as a function of α.

Figure 14:
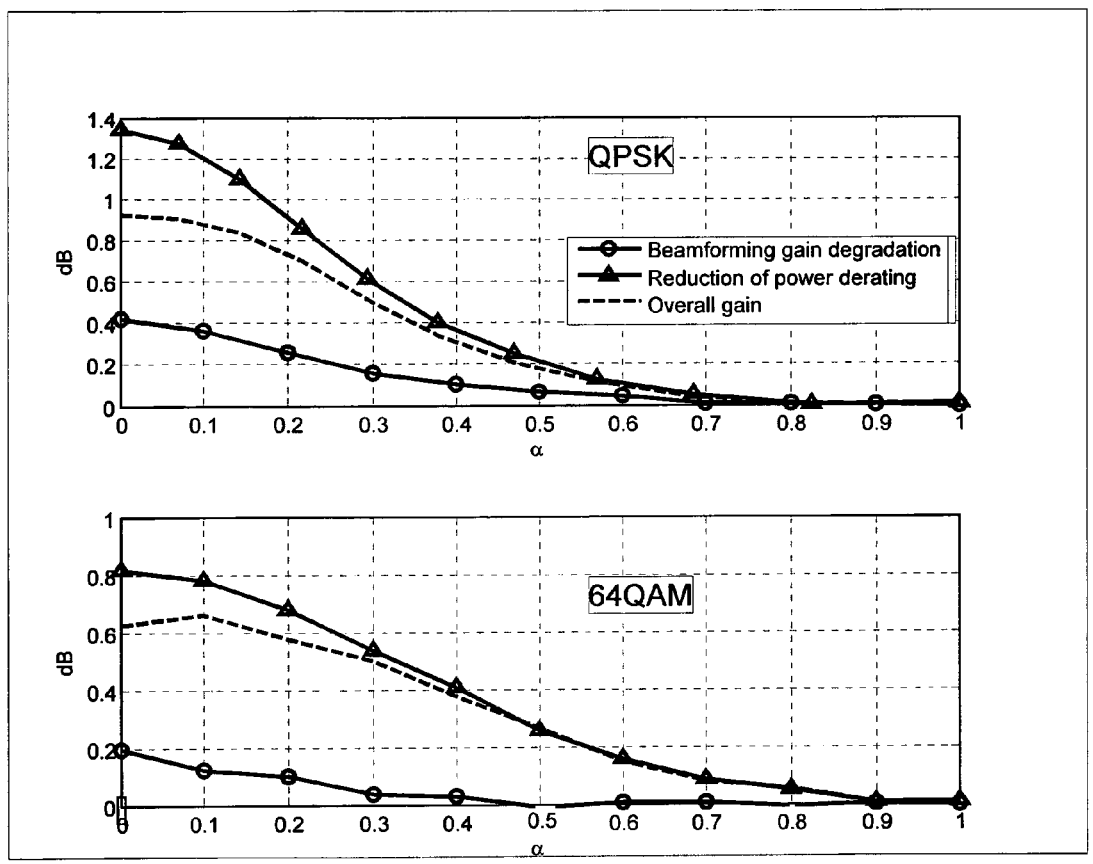
FIG. 14 is a diagram illustrating the performance of the present invention.

The upper subplot of FIG. 14 shows results for a QPSK modulation, while the second graph is based on 64QAM. For 64QAM the best trade-off between CM reduction and SNR loss is achieved for α=0.1, while the performance of QPSK is dominated by CM and it performs best with α=0, when the system is power limited.

The CM is evaluated in each transmitted sequence according to Eq 1 above.

The present invention is not limited to the above-describe preferred embodiments. Various alternatives, modifications and equivalents may be used. Therefore, the above embodiments should not be taken as limiting the scope of the invention, which is defined by the appending claims.

In particular, it should be noted that although terminology from 3GPP LTE has been used throughout this disclosure to exemplify the invention, this should not be seen as limiting the scope of the invention to only the aforementioned system. Other wireless systems, including WCDMA, WiMax, UMB and CDMA, may also benefit from exploiting the ideas covered within this disclosure.

The invention claimed is:

1. A method in a network node for adapting an OFDM or SC-OFDM signal for multi-antenna transmission, the network node being comprised in a wireless communications network, the method comprising the following steps:
receiving at least a first parameter being related to the transmit power requirements of the network node;
receiving a second parameter indicating a spatial precoder W;
determining, based on the at least first parameter, whether to use a modified spatial precoder; and, if it is determined to use a modified spatial precoder,
determining a spatial precoder $\tilde{W}$, having the same dimensions as W, using the spatial precoder W and the at least first parameter, wherein each element $\tilde{w}_{i,j}$ in $\tilde{W}$ equals the corresponding element $w_{i,j}$ in W multiplied by a factor $s_{i,j}$, wherein the factor $s_{i,j}$ depends on the value of the at least first parameter, and wherein the factor $s_{i,j}$ is less than or equal to one, and greater than or equal to zero;
adapting said signal for multi-antenna transmission using the spatial precoder $\tilde{W}$;
wherein the step of determining a spatial precoder $\tilde{W}$ comprises the steps of:
determining a shaping matrix S, having the same dimensions as W,
such that each element $s_{i,j}$ of S has a value either equal to one, or equal to one multiplied by a factor α, wherein the factor α depends on the value of the at least first parameter, and wherein the value of α is less than or equal to one, and greater than or equal to zero; and determining the spatial precoder $\tilde{W}$ as the element-wise product of S and W.

2. The method according to claim 1, wherein the at least first parameter comprises a power control command or information about the available power headroom of the network node.

3. The method according to claim 2, wherein the at least first parameter comprises an indication of a modulation coding scheme.

4. The method according to claim 1, wherein the step of determining a spatial precoder $\tilde{W}$ further comprises the step of multiplying each element of $\tilde{W}$ with a scalar factor, in order to normalize the power to the desired level.

5. The method according to claim 1, further comprising the step of receiving at least a third parameter indicating the factor α.

6. The method according to claim 1, further comprising the steps of
receiving at least a third parameter indicating a shaping matrix S; and
determining the spatial precoder $\tilde{W}$ as the element-wise product of S and W.

7. The method according to claim 1, further comprising the step of transmitting an indication that a modified spatial precoder is used to adapt said signal for multi-antenna transmission.

8. The method according to claim 1, further comprising the steps of
modifying at least one pilot signal using the spatial precoder W and the spatial precoder $\tilde{W}$; and
transmitting the at least one modified pilot signals.

9. The method according to claim 8, wherein the step of modifying the at least one pilot signal comprises multiplying the at least one pilot signal with the hermitian transpose of the spatial precoder W and with the precoder $\tilde{W}$.

10. The method according to claim 1, wherein the network node is a mobile terminal.

11. The method according to claim 1, wherein the network node is a radio base station.

12. A method in a network node for decoding an OFDM or SC-OFDM signal received from a transmitting node, the signal being adapted for multi-antenna transmission, the network node and the transmitting node being comprised in a wireless communications network, the method comprising the following steps:
determining at least a first parameter being related to the transmit power requirements of the transmitting node;
selecting a spatial precoder $\tilde{W}$ for decoding, based on the at least first parameter, wherein the spatial precoder $\tilde{W}$ is formed based on a spatial precoder W, having the same dimensions as $\tilde{W}$, such that each element $\tilde{w}_{i,j}$ in $\tilde{W}$ equals the corresponding element $w_{i,j}$ in W multiplied by a factor $s_{i,j}$, wherein the factor $s_{i,j}$ depends on the value of the at least first parameter, and wherein the factor $s_{i,j}$ is less than or equal to one, and greater than or equal to zero;
receiving a signal from the transmitting node;
decoding the received signal using the selected spatial precoder $\tilde{W}$;
sending the at least first parameter to the transmitting node;
selecting the spatial precoder W for encoding;
sending a second parameter indicating the selected spatial precoder W to the transmitting node;
and wherein the step of selecting the spatial precoder for decoding comprises determining a spatial precoder $\tilde{W}$ having the same dimensions as W, using the spatial precoder W and the at least first parameter, and selecting the spatial precoder $\tilde{W}$ as the spatial precoder for decoding, wherein the spatial precoder $\tilde{W}$ is determined such that each element $\tilde{w}_{i,j}$ in $\tilde{W}$ equals the corresponding element $w_{i,j}$ in W multiplied by a factor $s_{i,j}$, wherein the factor $s_{i,j}$ depends on the value of the at least first parameter, and wherein the factor $s_{i,j}$ is less than or equal to one, and greater than or equal to zero.

13. The method according to claim 12, wherein the at least first parameter comprises a power control command or information about the available power headroom of the network node.

14. The method according to claim 13, wherein the at least first parameter comprises an indication of a modulation coding scheme.

15. The method according to claim 12, wherein the step of selecting the spatial precoder for decoding comprises the steps of:
 determining a shaping matrix S, having the same dimensions as W, such that each element $s_{i,j}$ of S has a value either equal to one, or equal to one multiplied by a factor α, wherein the factor α depends on the value of the at least first parameter, and wherein the value of α is less than or equal to one, and greater than or equal to zero;
 determining a spatial precoder $\tilde{W}$ as the element-wise product of S and W; and
 selecting the spatial precoder $\tilde{W}$ as the spatial precoder for decoding.

16. The method according to claim 15, wherein the step of determining a spatial precoder $\tilde{W}$ further comprises the step of multiplying each element of $\tilde{W}$ with a scalar factor, in order to normalize the power to the desired level.

17. The method according to claim 15, comprising the further step of transmitting a third parameter indicating the factor α.

18. The method according to claim 15, further comprising the step of transmitting at least a third parameter indicating the shaping matrix S.

19. The method according to claim 12, further comprising the step of sending data indicating the selected spatial precoder to the transmitting node.

20. The method according to claim 12, further comprising the step of receiving an indication that a spatial precoder has been used to adapt said signal for multi-antenna transmission.

21. The method according to claim 12, wherein the network node is a mobile terminal.

22. The method according to claim 12, wherein the network node is a radio base station.

23. A network node for decoding an OFDM or SC-OFDM signal received from a transmitting node, the signal being adapted for multi-antenna transmission, the network node and the transmitting node being comprised in a wireless communications network, the network node comprising:
 a transmit power requirements determining unit, configured to determine at least a first parameter being related to the transmit power requirements of the transmitting node;
 a precoder selection unit, configured to select a spatial precoder $\tilde{W}$ for decoding, based on the at least first parameter, wherein the spatial precoder $\tilde{W}$ is formed based on a spatial precoder W, having the same dimensions as $\tilde{W}$, such that each element $\tilde{w}_{i,j}$ in $\tilde{W}$ equals the corresponding element $w_{i,j}$ in W multiplied by a factor $s_{i,j}$, wherein the factor $s_{i,j}$ depends on the value of the at least first parameter, and wherein the factor $s_{i,j}$ is less than or equal to one, and greater than or equal to zero;
 a receiving unit, configured to receive a signal from the transmitting node;
 a decoding unit, configured to decode the received signal using the selected spatial precoder $\tilde{W}$;
 further comprising a transmitting unit, and wherein
 the transmitting unit is configured to send the at least first parameter to the transmitting node;
 the precoder selection unit is further configured to select a spatial precoder W for encoding;
 the transmitting unit is further configured to send a second parameter indicating the selected spatial precoder W to the transmitting node;
 and wherein the precoder selection unit further comprises a codebook shaping unit, configured to determine a spatial precoder $\tilde{W}$ having the same dimensions as W, using the spatial precoder W and the at least first parameter, and is further configured to select the spatial precoder $\tilde{W}$ as the spatial precoder for decoding.

24. The network node according to claim 23, wherein the precoder selection unit further comprises a shaping matrix generating unit, configured to:
 determine a shaping matrix S, having the same dimensions as W, such that each element $s_{i,j}$ of S has a value either equal to one, or equal to one multiplied by a factor α, wherein the factor α depends on the value of the at least first parameter, and wherein the value of α is less than or equal to one, and greater than or equal to zero;
 and wherein the precoder selecting unit is further configured to:
 determine a spatial precoder $\tilde{W}$ as the element-wise product of S and W; and
 select the spatial precoder $\tilde{W}$ as the spatial precoder for decoding.

25. The method according to claim 24, wherein the step of determining a spatial precoder $\tilde{W}$ further comprise the steps of multiplying each element of $\tilde{W}$ with a scalar factor, in order to normalize the power to the desired level.

26. A method in a network node for adapting an OFDM or SC-OFDM signal for multi-antenna transmission, the network node being comprised in a wireless communications network, the method comprising the following steps:
 receiving at least a first parameter being related to the transmit power requirements of the network node;
 receiving a second parameter indicating a spatial precoder W;
 determining, based on the at least first parameter, whether to use a modified spatial precoder; and, if it is determined to use a modified spatial precoder,
 determining a spatial precoder $\tilde{W}$, having the same dimensions as W, using the spatial precoder W and the at least first parameter, wherein each element $\tilde{w}_{i,j}$ in $\tilde{W}$ equals the corresponding element $w_{i,j}$ in W multiplied by a factor $s_{i,j}$, wherein the factor $s_{i,j}$ depends on the value of the at least first parameter, and wherein the factor $s_{i,j}$ is less than or equal to one, and greater than or equal to zero;
 adapting said signal for multi-antenna transmission using the spatial precoder $\tilde{W}$;
 receiving at least a third parameter indicating a shaping matrix S; and
 determining the spatial precoder $\tilde{W}$ as the element-wise product of S and W.

* * * * *